(12) United States Patent
Pedley et al.

(10) Patent No.: US 12,352,888 B2
(45) Date of Patent: Jul. 8, 2025

(54) DATA PROCESSING METHOD FOR PROCESSING MATRICES IN RADAR APPLICATIONS

(71) Applicant: NXP B.V., Eindhoven (NL)

(72) Inventors: Mark Pedley, Glasgow (GB); Andrew Robertson, Glasgow (GB)

(73) Assignee: NXP B.V., Eindhoven (NL)

( * ) Notice: Subject to any disclaimer, the term of this patent is extended or adjusted under 35 U.S.C. 154(b) by 342 days.

(21) Appl. No.: 18/119,727

(22) Filed: Mar. 9, 2023

(65) Prior Publication Data

US 2024/0302494 A1    Sep. 12, 2024

(51) Int. Cl.
| | |
|---|---|
| G01S 7/41 | (2006.01) |
| G01S 7/03 | (2006.01) |
| G01S 13/931 | (2020.01) |
| G01S 7/35 | (2006.01) |
| G01S 13/58 | (2006.01) |

(52) U.S. Cl.
CPC ............... *G01S 7/415* (2013.01); *G01S 7/03* (2013.01); *G01S 13/931* (2013.01); *G01S 7/356* (2021.05); *G01S 13/582* (2013.01)

(58) Field of Classification Search
CPC .......... G01S 7/415; G01S 7/03; G01S 13/931; G01S 7/356; G01S 13/582; G01S 13/42; G01S 13/584; G06F 9/3887
See application file for complete search history.

(56) References Cited

U.S. PATENT DOCUMENTS

| | | | |
|---|---|---|---|
| 9,559,417 B1 * | 1/2017 | Schwarzwalder | ... H01Q 3/2605 |
| 2009/0073026 A1 | 3/2009 | Nakagawa | |
| 2012/0009942 A1 | 1/2012 | Zoubir | |
| 2012/0249360 A1 * | 10/2012 | Kanamoto | ............ G01S 13/345 |
| | | | 342/158 |

(Continued)

FOREIGN PATENT DOCUMENTS

CN    114488064 A    5/2022

OTHER PUBLICATIONS

N. Tayem and M. Naraghi-Pour, "Unitary Root MUSIC and Unitary MUSIC with Real-Valued Rank Revealing Triangular Factorization," MILCOM 2007—IEEE Military Communications Conference, Orlando, FL, USA, 2007, pp. 1-7, doi: 10.1109/MILCOM.2007.4454816. (Year: 2007).*

(Continued)

*Primary Examiner* — Vladimir Magloire
*Assistant Examiner* — Yonghong Li

(57) ABSTRACT

The present invention relates to radar systems and associated methods of operation. In one aspect, the present invention relates to an automotive radar system including at least one receiver configured to receive radar signals, a processing system configured to receive from at least one receiver, a received radar signal, process the received radar signal to generate a data frame that has dimensions of M rows by M columns of elements from a covariance matrix, determine a rank N of the data frame. The system is further configured to set all elements in a first subset of columns numbered N through M of the data frame to zero values to create a padded data frame, calculate a pseudo-inverse value of the padded data frame, determine a direction of arrival of at least one target using the pseudo-inverse value, and control an operation of a vehicle using the direction of arrival.

20 Claims, 19 Drawing Sheets

(56) References Cited

U.S. PATENT DOCUMENTS

2020/0301002 A1\* 9/2020 Wu .................... G01S 13/4454
2022/0260708 A1 8/2022 Zhang et al.
2023/0350054 A1\* 11/2023 Achatz .................. G06N 3/044

OTHER PUBLICATIONS

Slesicki Blazej et al.; "Analysis of the accuracy of the estimation of signal arrival angle in monostatic MIMO radar using the Capon algorithm and its modifications"; 2022 23rd International Radar Symposium (IRD); Sep. 12-13, 2022; Gdansk, Poland; DOI: 10.23919/IRS54158.2022.9905010.

\* cited by examiner

FIG. 4

DATA PROCESSING METHOD FOR PROCESSING MATRICES IN RADAR APPLICATIONS

BACKGROUND

Field

The present invention relates to radar systems and associated methods of operation. In one aspect, the present invention relates to an automotive radar system configured to process received radar signals to identify targets in a complex target environment using single instruction, multiple data (SIMD) processing of data matrices of different dimensions.

SUMMARY

The invention is directed to a data processing method for handling different sized matrices in radar applications. Additional features and advantages of the invention will be set forth in the description which follows and, in part, will be apparent from the description or may be learned by practice of the invention. The objectives and other advantages of the invention will be realized and attained by the structure, particularly set forth in the written description and claims hereof, as well as the appended drawings.

In some aspects, the techniques described herein relate to an automotive radar system, including a plurality of transmitters and a plurality of receivers, wherein the plurality of transmitters and the plurality of receivers are configured to transmit and receive radar signals, wherein the plurality of transmitters and the plurality of receivers are coupled to a vehicle; a processing system configured to receive, from the plurality of receivers, a plurality of received radar signals, wherein each received radar signal of the plurality of received radar signals is associated with a different transmitter of the plurality of transmitters, process the received radar signals to generate a plurality of range-Doppler data frames for each of the plurality of receivers, processing the plurality of range-Doppler data frames to determine a plurality of covariance matrices, wherein each covariance matrix in the plurality of covariance matrices has dimensions of M rows by M columns of elements, determine, for each covariance matrix in the plurality of covariance matrices, a rank N, wherein the rank N of each covariance matrix indicates a number of potential targets identified in the covariance matrix (i.e., elements within the covariance matrix reflecting a reflected radar signal magnitude that exceeds a predetermined threshold value indicating that a potential target has been identified when the values are compared), for each covariance matrix, calculating a unitary matrix and an upper triangular matrix by: setting all elements in a first subset of columns of the covariance matrix to zero values, where the first subset of columns includes columns numbered N through column M, to generate a full-size covariance matrix, performing decomposition of the covariance matrix to generate a first unitary matrix and a first upper triangular matrix, setting M–N diagonal elements of the first upper triangular matrix to a value 1 to generate a modified upper triangular matrix, calculating an inverse of the modified upper triangular matrix to determine an inverted upper triangular matrix, setting the M–N diagonal elements of the upper triangular matrix to a value 0 to generate the upper triangular matrix, and setting all elements in a second subset of columns of the first unitary matrix to zero values, where the second subset of columns includes columns numbered N through column M, to generate the unitary matrix; and a single instruction, multiple data processing system configured to execute a single instruction set configured to simultaneously calculate a plurality of pseudo-inverse values of the plurality of covariance matrices using the unitary matrices and the upper triangular matrices associated with each covariance matrix, wherein the processing system is configured to determine a direction of arrival of at least one of the targets using the plurality of pseudo-inverse value and control an operation of the vehicle using the direction of arrival.

In some aspects, the techniques described herein relate to a system, including at least one receiver configured to receive radar signals; and a processing system configured to receive, from the at least one receiver, a received radar signal, process the received radar signal to generate a data frame that has dimensions of M rows by M columns of elements from a covariance matrix, determine a rank N of the data frame set all elements in a first subset of columns numbered N through M of the data frame to zero values to create a padded data frame, calculate a pseudo-inverse value of the padded data frame, determine a direction of arrival of at least one target using the pseudo-inverse value, and control an operation of a vehicle using the direction of arrival.

In some aspects, the techniques described herein relate to a method, including receiving, from at least one receiver of a radar system, a received radar signal, processing the received radar signal to generate a covariance matrix and a data frame that has dimensions of M rows by M columns of elements from the covariance matrix, determining a rank N of the data frame, setting all elements in a first subset of columns numbered N through M of the data frame to zero values to create a padded data frame, calculating a pseudo-inverse value of the padded data frame, and determining a direction of arrival of at least one of target using the pseudo-inverse value.

This Summary section is neither intended to be nor should be construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 illustrates a visual depiction of matrices in a process according to an embodiment of the invention.

DETAILED DESCRIPTION

Figure 1A:
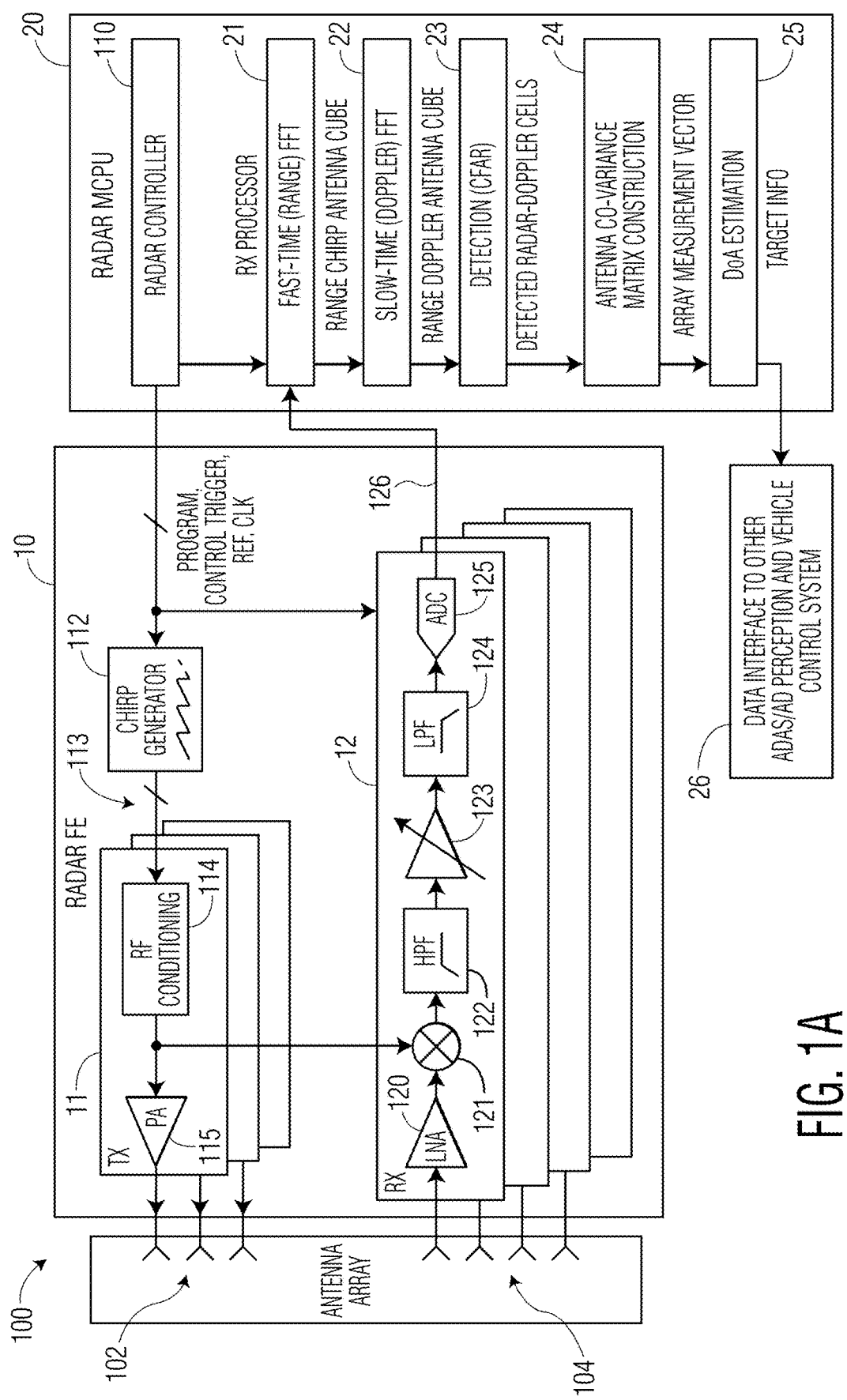
FIG. 1A depicts a simplified schematic block diagram of an automotive radar system which includes a radar device connected to a radar controller processor.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

In some implementations, radar signal processors incorporate single instruction, multiple data (SIMD) processing systems. A SIMD processing system is a type of parallel data processor in which a single processor is configured to execute the same set of instructions simultaneously on a number of different sets of data. As such, a single processor can simultaneously process large sets of data. These systems typically require that each data set being processed be in a particular format enabling that single set of instructions to be run for each data set without error. If a single data set being processed requires special handling, that can result in "branch divergence" in which the instruction set required to process one data set is different that the set of instructions required to process the other data sets. Any such divergence can render the benefits of SIMD processing moot as correct processing of all data sets cannot be done in parallel. As such, SIMD processing systems can provide good performance while reducing the need for multiple processing cores.

In a radar system, reflected radar signals are processed into data frames, which are essentially two-dimensional matrices where each element of each matrix represents a magnitude of the reflected radar signal (or derivatives thereof) at different times and signal chirp numbers. At any time, a number of different data frames can be generated for each transmitter in the radar system. These data frames are processed via a series of fast Fourier transforms (FFT), filters, and other processing elements to identify potential detected targets and their distance, speed, and direction of arrival (DOA). The initial steps of sub-space super-resolution radar DOA algorithms, such as unitary estimation of signal parameters via Unitary Estimation of Signal Parameters via Rotational Invariance Techniques (U-ESPRIT), perform linear algebra operations on a number of covariance matrices computed from range-Doppler data frames each having constant size as selected by the radar processing system's constant false alarm rate (CFAR) algorithm for DOA processing. SIMD branch divergence is generally not a concern at this stage of signal processing as this process involves processing of a plurality of covariance matrices (e.g., one for each range-Doppler bin selected by CFAR for DOA processing) that each comprises matrices of the same shape (i.e., dimension) and, as such, can be processed properly by the same instruction set.

In the mid part of the sub-space super-resolution signal processing algorithm, a "rank estimation" step is performed that equates to determining how many reflectors (i.e., potential targets) at different reflector DOA angles are present within each range-Doppler covariance matrix selected by CFAR in the radar data frame. That may involve, for example, comparing the values of elements within the covariance matrix to a predetermined threshold value to detect potential targets. In one embodiment, the rank estimation algorithm estimates how many targets, each at a different DOA angle, are present in each covariance matrix selected by CFAR by analyzing the distribution of eigenvalues of the covariance matrix. From this point onwards in the signal processing algorithm, the SIMD implementation may be required to operate on matrices with the same number of rows corresponding to time increments in this embodiment, but having different number of columns. The different number of columns are equal to a rank N, wherein the rank N of each covariance matrix indicates a number of potential targets identified in the covariance matrix (i.e., elements within the covariance matrix reflecting a reflected radar signal magnitude that exceeds a predetermined threshold value indicating that a potential target has been identified when the values are compared). This can result in SIMD processing divergence because the same set of instructions cannot be used to process matrices that are of different dimensions.

One of the major operations that is performed after the rank estimation step in the signal processing algorithm is the calculation of the Moore-Penrose pseudo-inverse of the ranked covariance matrices where the number of matrix columns (but not rows) can be different for each of the matrices (i.e., problem instances), depending upon the rank of the covariance matrix (i.e., the number of target reflectors present in the covariance matrix). Consequently, the standard single core algorithm for computing the pseudo-inverse by QR decomposition that would be utilized by a SIMD processing to calculate pseudo-inverses of each matrix cannot be used since instructions that involve looping over all matrix columns would have to be different for each vector core storing the different matrices, which may not be possible on a SIMD processing system. Consequently, embodiments of the present disclosure are directed towards modification of the pseudo-inverse from QR decomposition process that enables the pseudo-inverse of all input matrices to be substantially simultaneously computed on a SIMD processing system where the problem instances may have differing numbers of columns.

In one context of the present disclosure, it will be appreciated that radar systems may be used as sensors in a variety of different applications, including but not limited to automotive radar sensors for road safety and vehicle control systems, such as advanced driver-assistance systems (ADAS) and autonomous driving (AD) systems.

In order to illustrate the design and operation of a vehicle radar system, reference is now made to FIG. 1A which depicts a simplified schematic block diagram of an automotive radar system 100 signals processing system that includes a radar device 10 connected to a radar controller processor 20. In selected embodiments, the radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or monostatic radar device 10 is shown, it will be appreciated that additional distributed radar devices may be used to form a distributed or multi-static radar. In addition, the depicted radar system 100 may be implemented in integrated circuit form with the device 10 and the radar controller processor 20 formed with separate integrated circuits (chips) or with a single chip, depending on the application.

Within radar system 100 each radar device 10 includes one or more transmitting antenna elements 102 and receiving antenna elements 104 connected, respectively, to one or more radio frequency (RF) transmitter (TX) units 11 and receiver (RX) units 12. For example, each radar device (e.g., 10) is shown as including individual antenna elements 102, 104 (e.g., TX1,$i$, RX1,$j$) connected, respectively, to three transmitter modules (e.g., transmitter modules 11) and four receiver modules (e.g., receiver modules 12), but these numbers are not limiting, and other numbers are also possible, such as four transmitter modules 11 and six receiver modules 12, or a single transmitter module 11 and/or a single receiver module 12. In one embodiment, FIG. 1A depicts radar system 100 in a multiple input multiple output (MIMO) configuration in which the three transmitters (3Tx) and four receivers (4Rx) may be operated in different combinations leading to twelve virtual receivers, e.g., Rx antenna elements.

Each radar device 10 also includes a chirp generator 112 that is configured and connected to supply a chirp input signal to the transmitter modules 11. To this end, the chirp generator 112 is connected to receive a separate and independent local oscillator (LO) signal, and a chirp start trigger signal. The operation of transmitter modules 11 may be controlled by a controller 110 that may be implemented, in whole or in part, by processor 20. Chirp signals 113 are generated and transmitted to transmitter modules 11, usually following a pre-defined transmission schedule, where the chirp signals 113 are filtered at the RF conditioning module 114 and amplified at the power amplifier 115 before being fed to the corresponding transmit antenna 102 (TX1,$i$) and radiated. By sequentially using each transmit antenna 102 to transmit successive pulses in the chirp signal 113, each transmitter module 11 can operate in a time-multiplexed fashion in relation to other transmitter modules 11 because they are programmed to transmit identical waveforms on a temporally separated schedule. It is also noted that in this embodiment, a time-division MIMO approach is implemented and configured to achieve a high resolution. However, other techniques can also be used, e.g., FMCW chirp waveforms or other waveforms as known in the art. The radar signal transmitted by the transmitter antennas 102 (TX1,$i$, TX2,$i$) may be reflected by an object, and part of the reflected radar signal reaches the receiver antenna units 104 (RX1,$i$) at the radar device 10. At each receiver module 12, the received (radio frequency) antenna signal is amplified by a low noise amplifier (LNA) 120 and then fed to a mixer 121 where the received signal is mixed with the transmitted chirp signal generated by the RF conditioning module 114. The resulting intermediate frequency signal is fed to a first high-pass filter (HPF) 122. The resulting filtered signal is fed to a first variable gain amplifier 123, which amplifies the signal before feeding it to a first low pass filter (LPF) 124. This re-filtered signal is fed to an analog/digital converter (ADC) 125 and is output by each receiver module 12 as a digital signal 126 (D1). The receiver module compresses a target echo of various delays into multiple sinusoidal tones whose frequencies correspond to the round-trip delay of the echo.

The radar system 100 also includes a radar controller processing unit 20 that is connected to supply input control signals to the radar device 10 (e.g., via controller function 110) and to receive therefrom digital output signals (e.g., digital signal 126) generated by the receiver modules 12.

In selected embodiments, the radar controller processing unit 20 may be embodied as a microcontroller unit (MCU) or another processing unit that is configured and arranged for signal processing tasks such as but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 20 may be configured to program the transmitter modules 11 to operate in a time-division fashion by sequentially transmitting LFM (Linear Frequency Modulated) chirps for coordinated communication between the transmit antennas 102 TX1,$i$, RX1,$j$.

Radar controller processor 20 is configured to process digital signal 126 to ultimately identify the distance and relative speed of target objects as well as an angular position of those objects with respect to radar system 100. Digital signal 126 includes a sequence of digital values representing magnitudes of radar signals received by receiving antenna elements 104 captured over time. Typically, each digital value is associated with a particular chirp number and sample number, where a single sample number may capture signals associated with a number of different chirps.

FIG. 1A shows the series of signal processing steps that are implemented by processor 20 in order to properly process digital signal 126 received from radar device 10 to identify potential nearby target objects. To complement FIG. 1A, FIG. 1B graphically depicts the processing steps that may be implemented by processor 20 to process digital signals 126.

Figure 1B:
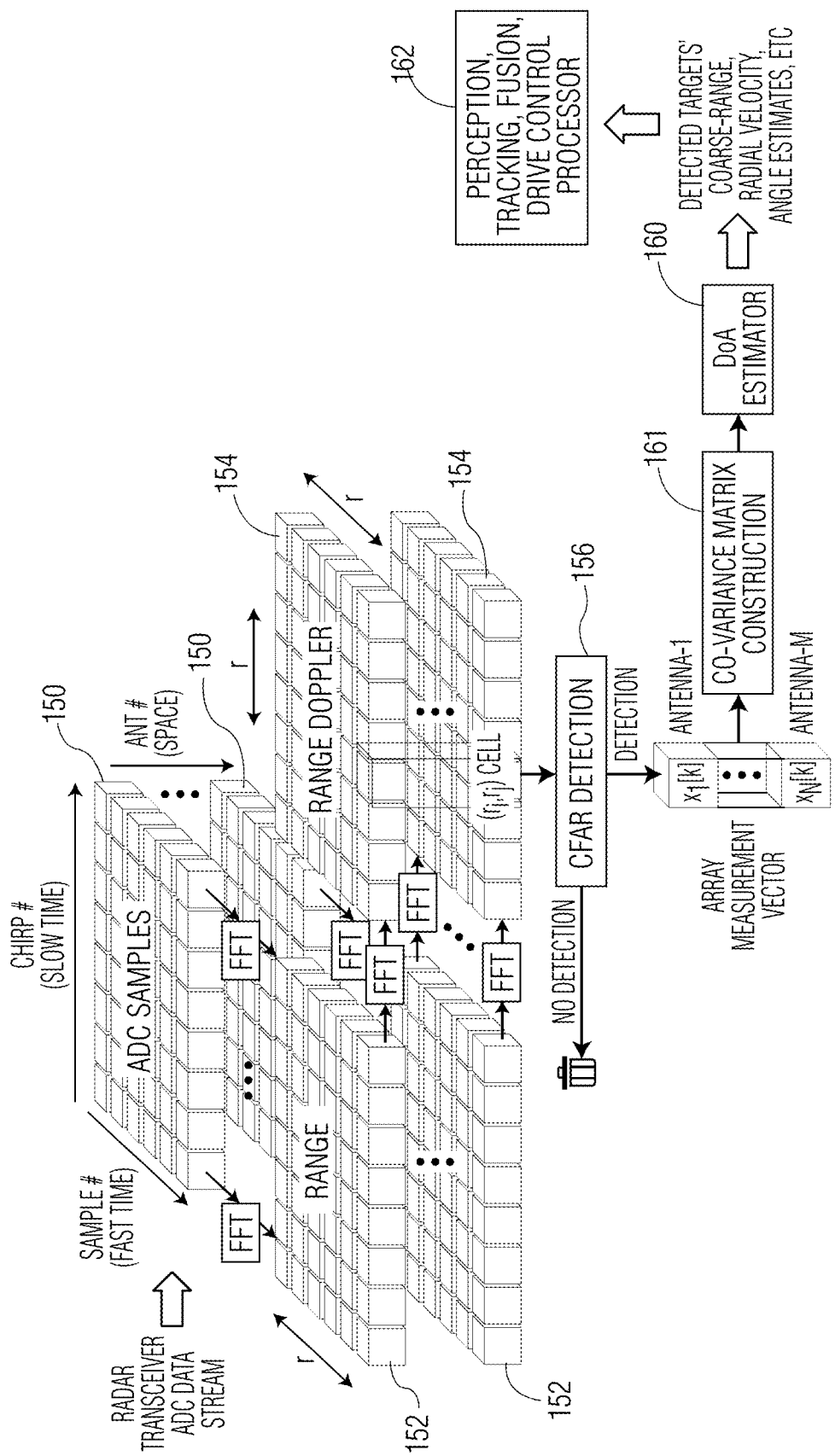
FIG. 1B graphically depicts the processing steps that may be implemented by a processor to process digital signals received from the automotive radar system of FIG. 1A.

The content of digital signals 126 is made up of a series of data frames that include a number of digital sample values (e.g., captured by ADCs 125 of receiver units 12) where the sample values are arranged in a two-dimensional matrix that is generated based upon a sequence of pulsed signals. In various embodiments, the digital signals 126 are processed via a MIMO array measurement to generate an input to a Fast Frequency Fourier transform (FFT) 21 block. The data structure making up a single captured frame is depicted by matrix 150 in FIG. 1B. As depicted, a single frames-worth of data in matrix 150 includes a two-dimensional matrix with a first dimension that is referred to as the "fast time" dimension and represents data values that were captured from the different pulsed signals. The second dimension of matrix 150 is referred to as the "slow time" dimension and represents data values that were captured in response to the different chirp signals that may be included within a particular pulsed signal that was transmitted by transmitter modules 11. As shown in FIG. 1B, signal processing may involve processing multiple frames of data represented by the matrices 150. Typically, a frame of data represented by a matrix 150 is captured for each receive channel. As such, FIG. 1B depicts multiple matrices 150 that are each associated with a different receive channel and may be received as input data to the signal processing chain.

For each received frame of data represented by matrix 150, radar controller processor 20 initially performs a Fast Fourier transform (FFT) 21 (FIG. 1A) to generate new frame data represented by matrix 152. The FFT 21 is executed on the 1-D arrays of data (i.e., the signal) associated with each distinct chirp in the original input frame 150 to generate a transformed 1-D transformed signal of the same length. The FFTs of each chirp in the original input frame represented by matrix 150 are combined to generate the transformed frame as indicated by matrix 152. This process is repeated for each frame associated with each receive channel. The resulting data frames, which represent range maps, are represented in FIG. 1B as matrices 152 and can be used to determine a distance to particular targets as reflected in the range maps.

In a next step, the radar controller processor 20 performs an additional fast-time range frequency Fourier transform (FFT) 22 (FIG. 1A) (referred to as the range-Doppler FFT) on the range maps to generate new range-Doppler frame data represented by matrices 154. In this step, however, FFT 22 is applied along the opposite dimension from the FFT 21. As such, the FFT 22 is executed on the 1-D arrays of data (i.e., the signal) in matrices 152 associated with each range bin in the matrix 152 to generate a transformed 1-D transformed signal of the same length. The FFTs of each signal in the frames of matrices 152 are combined to generate the 2D range-Doppler data frames as indicated by matrices 154. This process is repeated for each frame associated with each receive channel. The range-Doppler data frames associated with matrices 154 provide information about the movement of a potential target over time from one sample number to the next. With the data frames associated with matrices 154 generated, it is possible to process the data encoded therein to begin identifying potential targets and, in the case of a detected target, determine its range, velocity and direction of arrival.

Accordingly, the radar controller processor 20 performs constant false alarm rate (CFAR) target detection 23 (FIG. 1A), 156 (FIG. 1B). This involves the processor 20 analyzing cells in each of the range-Doppler data matrices 154 that each were originally associated with the same chirp number and sample number (but different receive channels) to determine whether a legitimate target has been detected based on the signals associated with those particular cells. Accordingly, this involves, for the same range bin and velocity bin, analyzing the processed data for each receiver channel to determine whether a target has been detected.

In this embodiment, covariance matrices are constructed from the antenna range-Doppler measurements selected by the CFAR algorithm as shown in block 24 (FIG. 1A) and block 161 (FIG. 1B). The phase shifts of the range-Doppler bin across the antenna elements due to the different reflector DOA angles present in the selected range-Doppler bin are then embedded in the covariance matrix. The covariance matrices are the input to the DOA estimation algorithm 25 (FIG. 1A), 160 (FIG. 1B), which estimates the number of reflectors contributing to the covariance matrix and their individual DOA angles. The reflector and DOA information (which can include range and velocity information) can then be transmitted via a data interface to a vehicle ADAS perception and vehicle control system 26 (FIG. 1A), 162 (FIG. 1B) to enable the vehicle control system to take appropriate action.

In one embodiment, during the signal processing steps of FIGS. 1A-1B, a rank estimation step is performed to determine how many reflectors (i.e., potential targets) at different reflector DOA angles are present within each covariance matrix constructed from CFAR-selected range-Doppler bin (e.g., the range-Doppler data frames as indicated by matrices 154). The rank-estimation is typically computed from the distribution of the eigenvalues of each covariance matrix. From this point onwards, the approach for SIMD processing of covariance matrices is presented in accordance with the SIMD implementation of U-ESPRIT algorithm as a non-limiting illustrative example of a covariance matrix super-resolution DOA algorithm, though it should be understood that other DOA algorithms may benefit from the present matrix processing approach. In this embodiment, the SIMD implementation of U-ESPRIT operates on data frame matrices with the same number of rows but with a different number of columns equal to the rank or number of reflectors identified within that particular covariance matrix.

One of the operations after the rank estimation step is the calculation of the Moore-Penrose pseudo-inverse, where the number of matrix columns (but not rows) can be different for each of the problem instances (i.e., matrices) to be processed. The standard single core algorithm for computing the pseudo-inverse by QR decomposition may not be used because processing of data encoded within matrix columns may be different for each vector core (due to the non-uniform dimensions of the various covariance matrices) and this may not be possible on a SIMD engine. Accordingly, a new approach for determining a pseudo-inverse value by QR decomposition is presented that permits the pseudo-inverse to be computed on a SIMD engine where each problem instance may have different dimensions (e.g., different numbers of columns).

After the rank estimation step in a SIMD implementation of U-ESPRIT is completed to identify the rank of a number of different covariance matrix, each of the SIMD system's vector cores stores an M× M square matrix ready for processing that is derived from the eigen decomposition of the covariance matrix as described herein. Each core also stores the rank N for its problem instance matrix where 1≤N≤ M. The next step of the process is to compute the pseudo-inverse of the M×N matrix formed from the leftmost N columns of each problem instance matrix. Since the rank N of each matrix within each vector core can be different, control plane branch divergence may occur if a standard processing approach is used. For example, the number of matrix rows M (constant across matrix instances) is the maximum signal space dimension and is one less than the number of antenna elements P in the radar system (e.g., radar system 100). For the case of three transmit antennas (e.g., transmitting antenna elements 102) and four receive antennas (e.g., receiving antenna elements 104) operating in a MIMO configuration, the number of virtual antennas P equals 12. The rank N is the number of reflectors present and varies from 1 to 11 for this MIMO example. In one embodiment, the P antenna elements can resolve up to P−1 reflectors. The condition N=0 corresponds to no reflector being present, such that the corresponding range-Doppler bin would not be selected by CFAR for DOA processing. However, in the case N=0 can also be accommodated in the present SIMD algorithm although the condition is not addressed directly.

Figure 2:
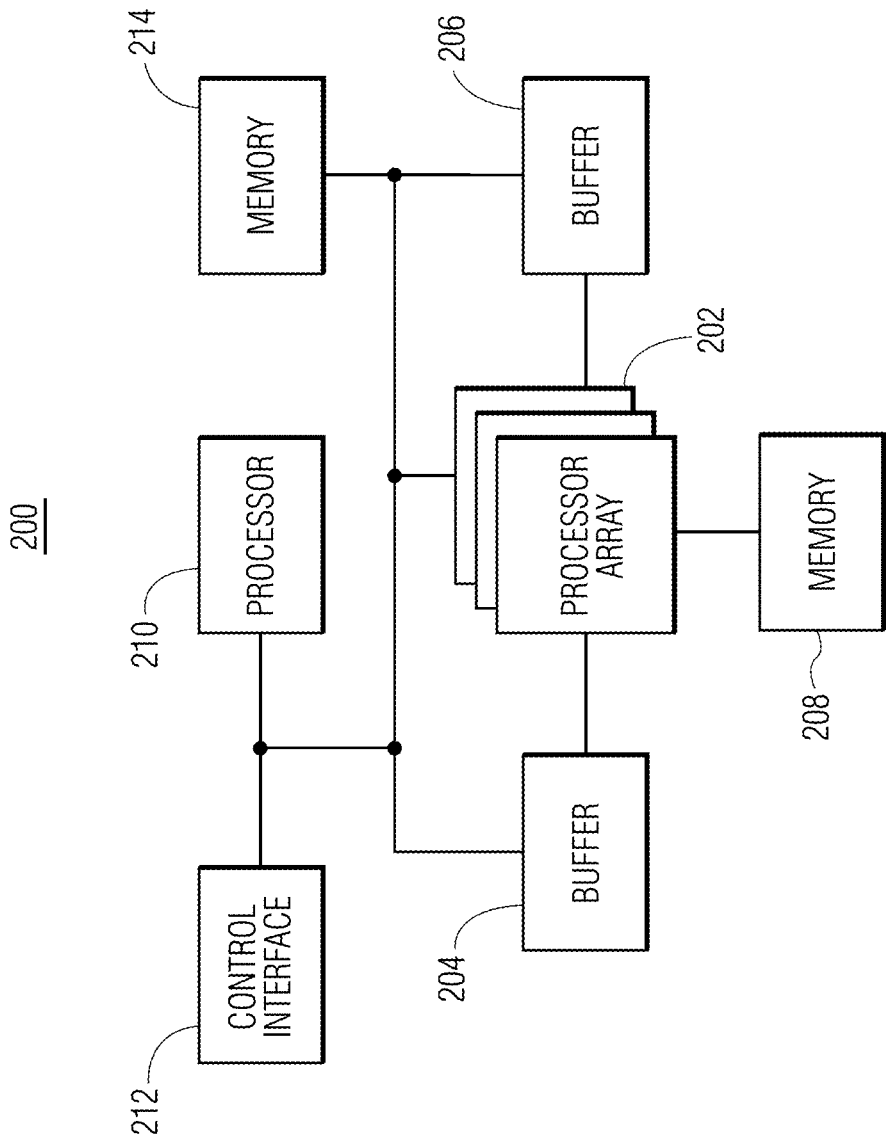
FIG. 2 illustrates a processing module according to an embodiment of the invention.

In various embodiments, the multiple matrices of different rank and, consequently, dimensions, can be processed using a SIMD processing system, such as the system illustrated in FIG. 2. Specifically, FIG. 2 is a block diagram depicting functional components of an example SIMD processing module configured to determine pseudo-inverse values of multiple matrices in accordance with the present disclosure. Referring to FIG. 2, the SIMD processing module is generally depicted as system 200 and may be constructed and implemented as known in the art. In one embodiment, system 200 includes a processing module 202 configured to execute an instruction set that may be stored within memory 208, which includes a non-transitory computer readable storage medium. Processing system 202 is connected to a memory 214 (that may, in some embodiments, be part of memory 208). Memory 214 is configured to store data accessible to the plurality of processor cores in the processor array 202, where each processor core operates on the content of one of the plurality of matrices being processed by system 200.

Processing module 202 is coupled to I/O buffer 204, I/O buffer 206, which can be internal or external the processing module 202, and each other. In one embodiment, the operation of system 200 is controlled by a master controller 210 via the I/O controllers, and a control interface 212.

During operation of the SIMD processing system (e.g., system 200 of FIG. 2), the system is configured to execute (e.g., using processing module 202) a single set of instructions (e.g., retrieved from memory 208) that cause the system to simultaneously process each of a number of different input matrices (e.g., stored within memory 208) to determine their pseudo-inverse values. In various embodiments of the present system, this may involve the SIMD processing system calculating pseudo-inverses of a plurality of ranked matrices, such as the M×N ranked matrices generated by the U-ESPRIT algorithm implementing direction of arrival analysis on a number of frames of data generated by a radar system (e.g., radar system 100). In one embodiment, the various matrices may not be of the same dimensions and in such case includes matrices of different ranks N. When the matrices have different dimensions or different ranks N the conventional SIMD processing approach cannot be executed against such a set of matrices due to branch divergence resulting from the mismatched sizes. However, to remedy this difficulty, the present disclosure provides an approach for modifying matrices in the set of ranked matrices so that all ranked matrices are of the same dimensions and can be processed using a SIMD processing system.

The covariance matrices constructed from the range-Doppler bins identified by CFAR as potentially including targets are processed by decomposing the covariance matrices to give an eigenvectors matrix E and eigenvalues vector. The rank N or number of reflectors is determined from the distribution of the eigenvalues. Knowledge of N allows the separation of the eigenvector's matrix E into signal space $E_S$ and noise space $E_N$ sub-matrices where $E=(E_S\ E_N)$. For P antenna elements, the signal space matrix $E_S$ has dimensions P×N and the noise space matrix $E_N$ has dimensions P×(P−N). The rank N varies from 1 to P−1 and will in general, be different for each covariance matrix instance being processed in the SIMD engine.

For the specific case of the U-ESPRIT signal processing algorithm applied to signal data captured by a radar system with P antennas, the Moore-Penrose pseudo-inverse $(K_1E_S)^+$ (where the super-script+means the Moore-Penrose pseudo-inverse) is a required value. The constant matrix $K_1$ has dimensions (P−1)×P and $E_S$ has P rows but a variable number of columns N varying from 1 to the maximum P−1. As illustrated in the example presented below, for all covariance matrices being processed, the pseudo-inverse $(K_1E_S)^+$ can be computed using the present algorithm in the same manner that would be used if each input matrix $E_S$ has the maximum rank of N=P−1 irrespective of their individual actual rank values of N. As such, a single instruction set can be used to calculate the pseudo-inverse $(K_1E_S)^+$ on all input matrices simultaneously without branch divergence.

Figure 3A:
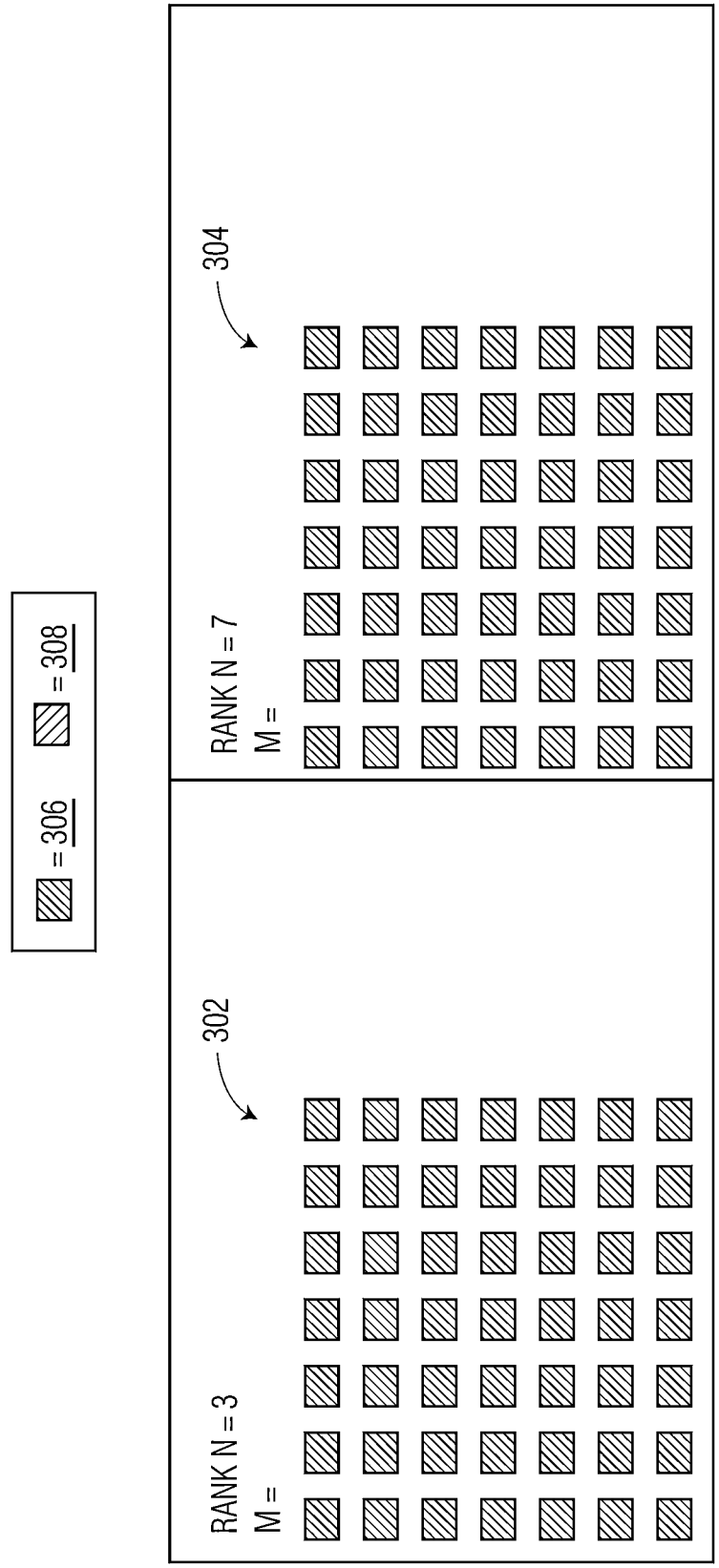
FIGS. 3A-3B illustrate a visual depiction of matrices in a process according to an embodiment of the invention.

To illustrate, assuming P=8 antenna elements, FIG. 3A depicts two input matrices $K_1E_S$ derived from covariance matrices with rank N=3 (matrix 302) and N=7 (matrix 304). Elements 302, 304 in FIG. 3A show the two matrices $K_1E_S$ computed with the maximum P−1 columns.

In order to calculate the pseudo-inverse (e.g., via QR decomposition) of both matrices 302 and 304 using a SIMD processing system, the present disclosure provides an approach for manipulating these matrices while maintain their overall dimensions of M×M to allow computation of the pseudo-inverse values using the same instruction set in a SIMD processing system.

Figure 3B:
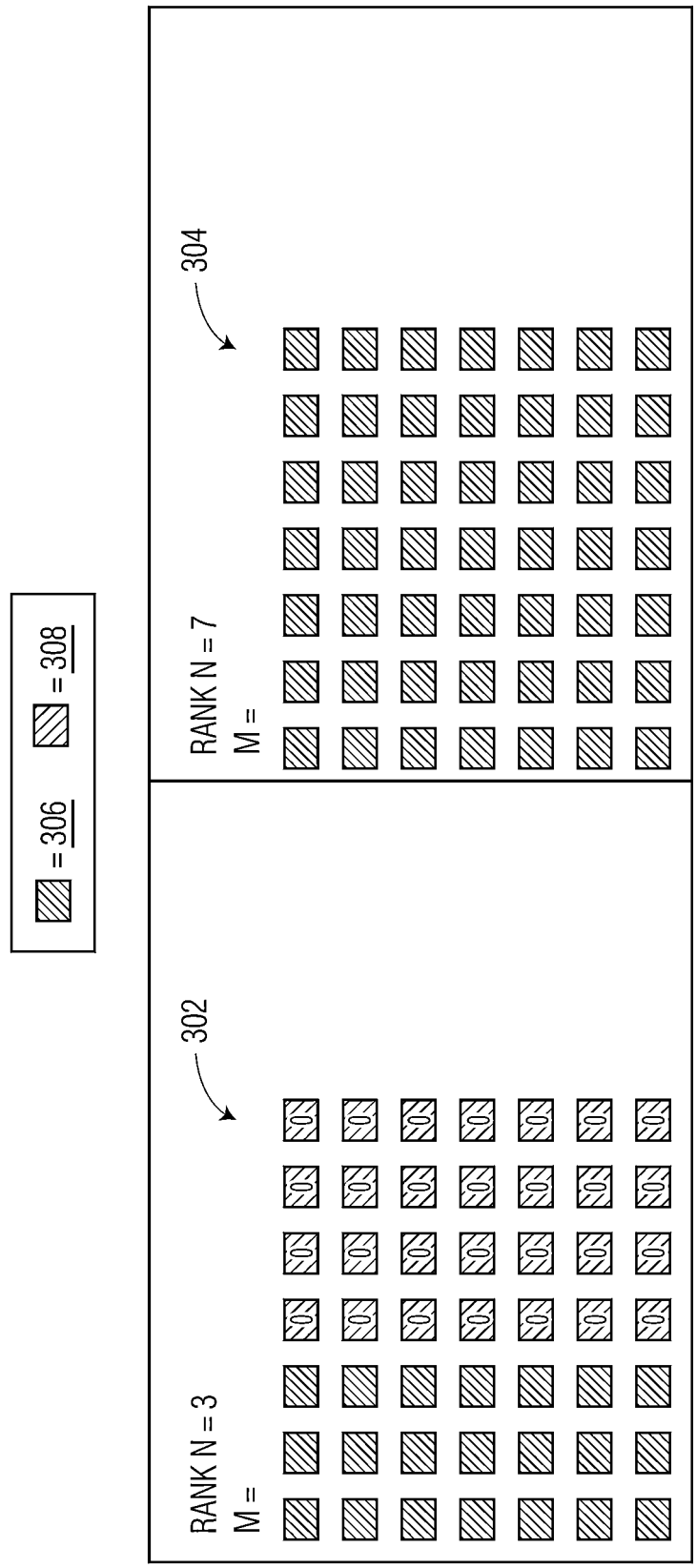

FIG. 3B shows matrices 302 and 304 modified to account for their respective rank N according to the U-ESPRIT signal processing algorithm. As shown in FIG. 3B, for matrix 302 (rank N=3), the leftmost N signal space columns are retained while the remaining subset M−N noise space columns are set to zero values to create a full-size (i.e., N×N) padded matrix 302. Conversely, because matrix 304 is of rank N=7 all columns are retained with no values being affirmatively set to 0 values. In both cases, the matrices retain their dimensions of M×M where M=7. Each block 308 in matrices is represented with a zero value.

Both matrices 302 and 304 can then be processed using the maximum sized square M×M QR decomposition to generate the unitary matrix Q and the upper triangular matrix R. Since the input matrices 302 and 304 all have the same size M×M there is no control plane branch divergence. This is in contrast to conventional signal processing techniques that would call for processing matrix 302 as a 7×3 matrix (due to its rank of 3) using a first instruction set and processing of matrix 304 as a 7×7 matrix (due to its rank of 7) using a second instruction set.

Figure 4:
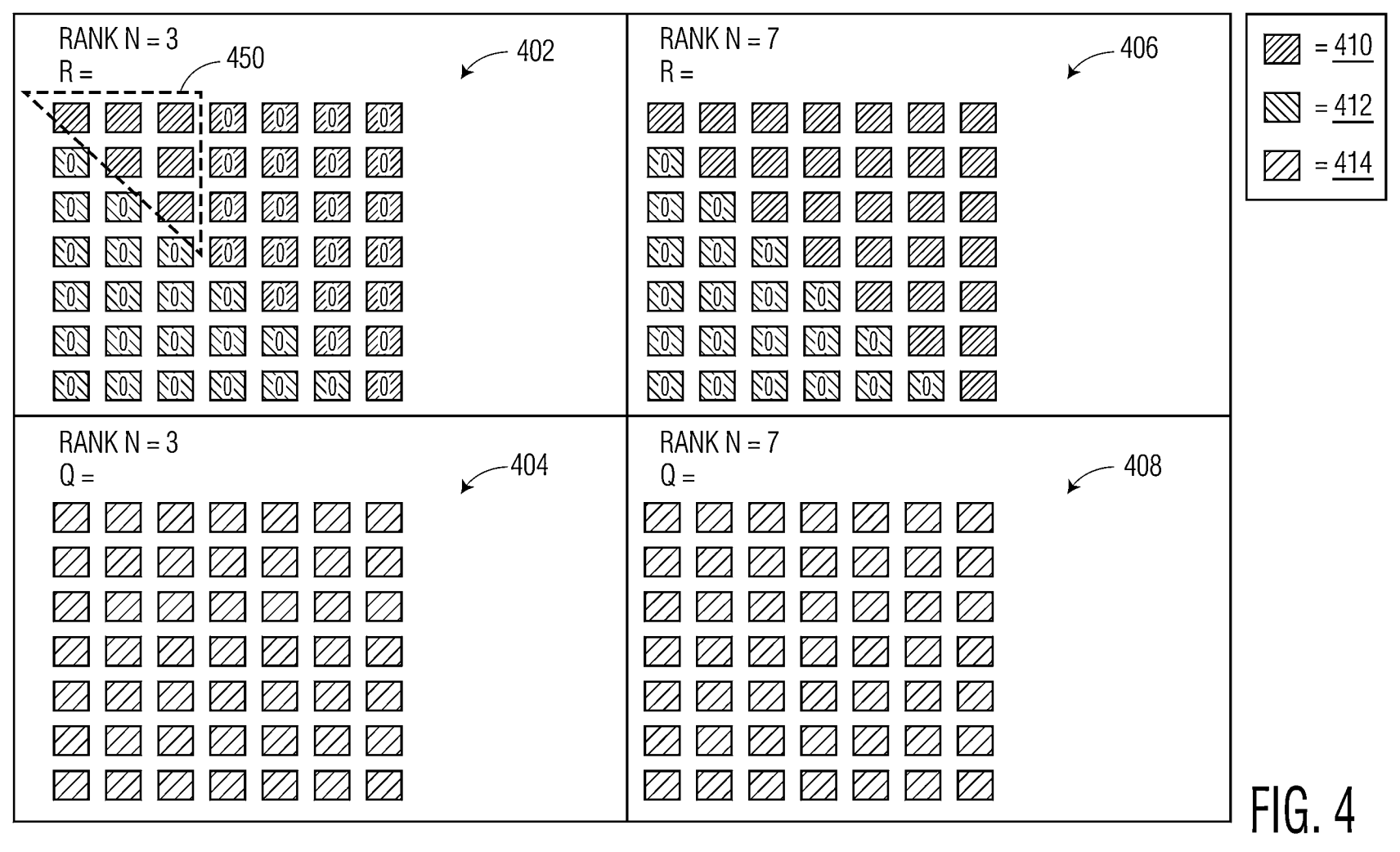

The resulting R and Q matrices are shown in FIG. 4. Specifically, in FIG. 4 matrix 402 is the R matrix of decomposed matrix 302 and matrix 404 is the Q matrix of decomposed matrix 302. Similarly, matrix 406 is the R matrix of decomposed matrix 304 and matrix 408 is the Q matrix of decomposed matrix 302. Each block 410 in the various matrices represents values that are not pertinent to the pseudo-inverse calculation. Each block 412 in matrices is represented with a zero value. Each block 414 in matrices is represented with a value.

To calculate the pseudo-inverse of both input matrices 302 and 304, an inverse is required of the N×N upper triangular matrices in the upper rights (see the elements of matrix 402 of dashed line 450) of matrix 402. This upper right triangular matrix, however, is embedded within the larger M×M matrix R 402. This is in contrast to the R matrix 406 where, due to the matrix 304 being of rank N=M, the upper right triangular matrix comprises the entire R matrix 406. Because the upper triangular matrices of matrices 402 and 406 are of different dimensions, the same instruction set (i.e., as being executed by a SIMD processing system) cannot be used to process both matrices at the time. Moreover, in R 402, N=3, one cannot attempt to compute the inverse of the full 7×7 upper right block because it is singular, i.e., no inverse, due to the zeros in the lower right four diagonal elements.

Figure 5:
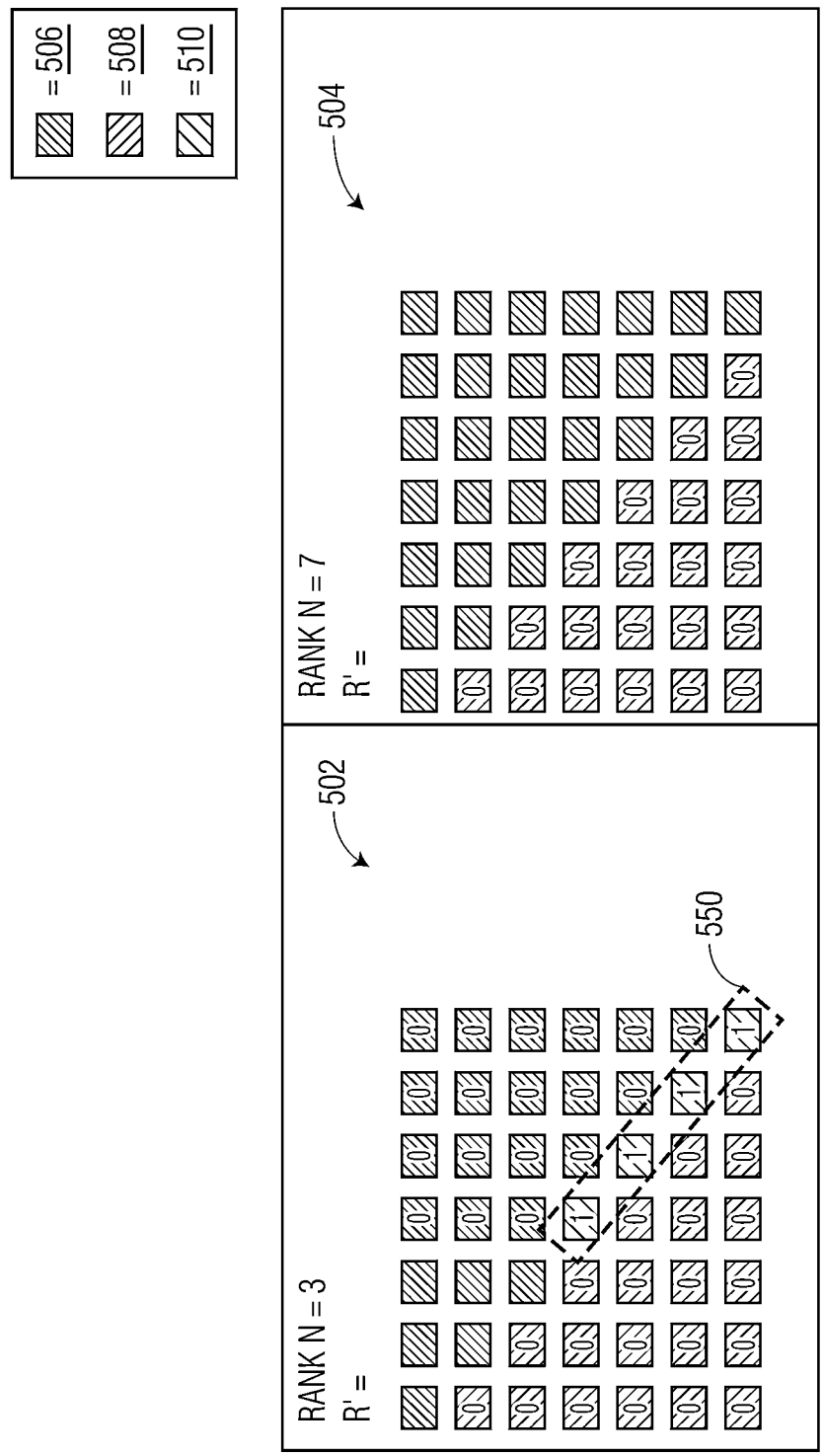
FIG. 5 illustrates a visual depiction of matrices in a process according to an embodiment of the invention.

To remedy this problem, the solution of the present disclosure calls for setting the lower right M−N diagonal elements of the R matrices 402 and 406 to the value 1. The so-modified matrices are illustrated in FIG. 5 as matrices 502 and 504. Each block 506 in matrices is represented with a value as shown in FIG. 5. Each block 508 in matrices is represented with a zero value. As illustrated in FIG. 5, in matrix 502 the lower right M−N diagonal elements (i.e., the blocks 510 designated by dashed line 550) have each been set to the value 1. The same modification can be performed on the second matrix 406; however, because for that matrix M=N, the operation does not result in the modification of any values in the resulting matrix 504. With matrices 502 and 504 so processed, inverses of the upper triangular matrices 602 and 604 can be calculated. This step relies upon the matrix property that for any block matrix containing sub-block I and invertible block A the following property holds with Equation (1):

$$\begin{pmatrix} A & O \\ O & I \end{pmatrix}^{-1} = \begin{pmatrix} A^{-1} & O \\ O & I \end{pmatrix}$$

Figure 6:
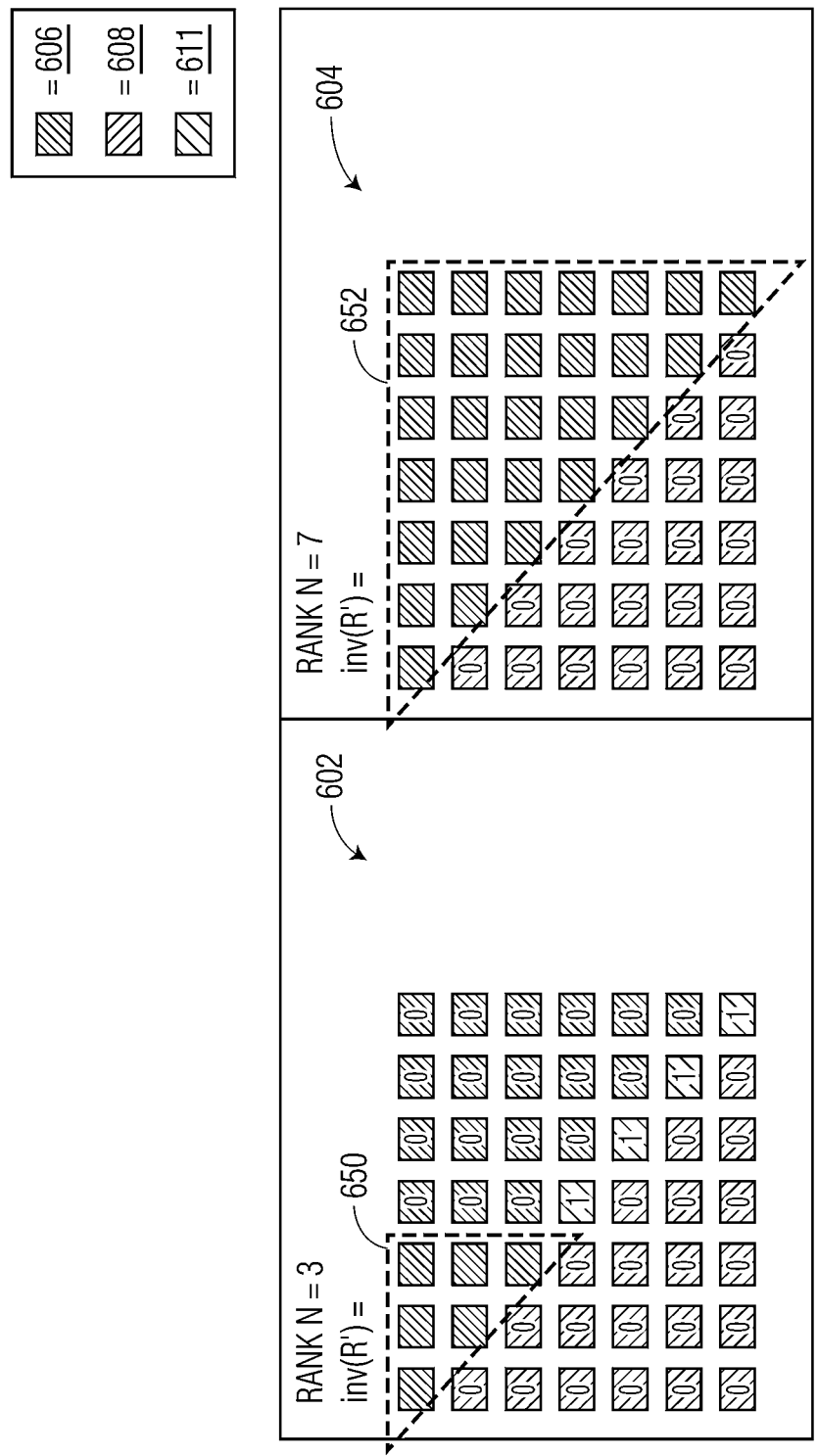
FIG. 6 illustrates a visual depiction of matrices in a process according to an embodiment of the invention.

The inverse of an upper triangular matrix is also upper triangular. Consequently, computing the full-sized M× M upper triangular matrix inverse by a back substitution algorithm gives a solution as shown by matrices 602 and 604 of FIG. 6. The required N×N inverted upper triangular matrix is apparent in the upper left of matrix 602 is available, as indicated by the elements contained with dashed line 650. The inverted triangular matrix of matrix 604 includes all elements indicated by dashed line 652. Each block 606 in matrices is represented with a value that is unimportant. Each block 608 in matrices is represented with a zero value. Each block 611 in matrices is represented with a value of one "1".

Figure 7:
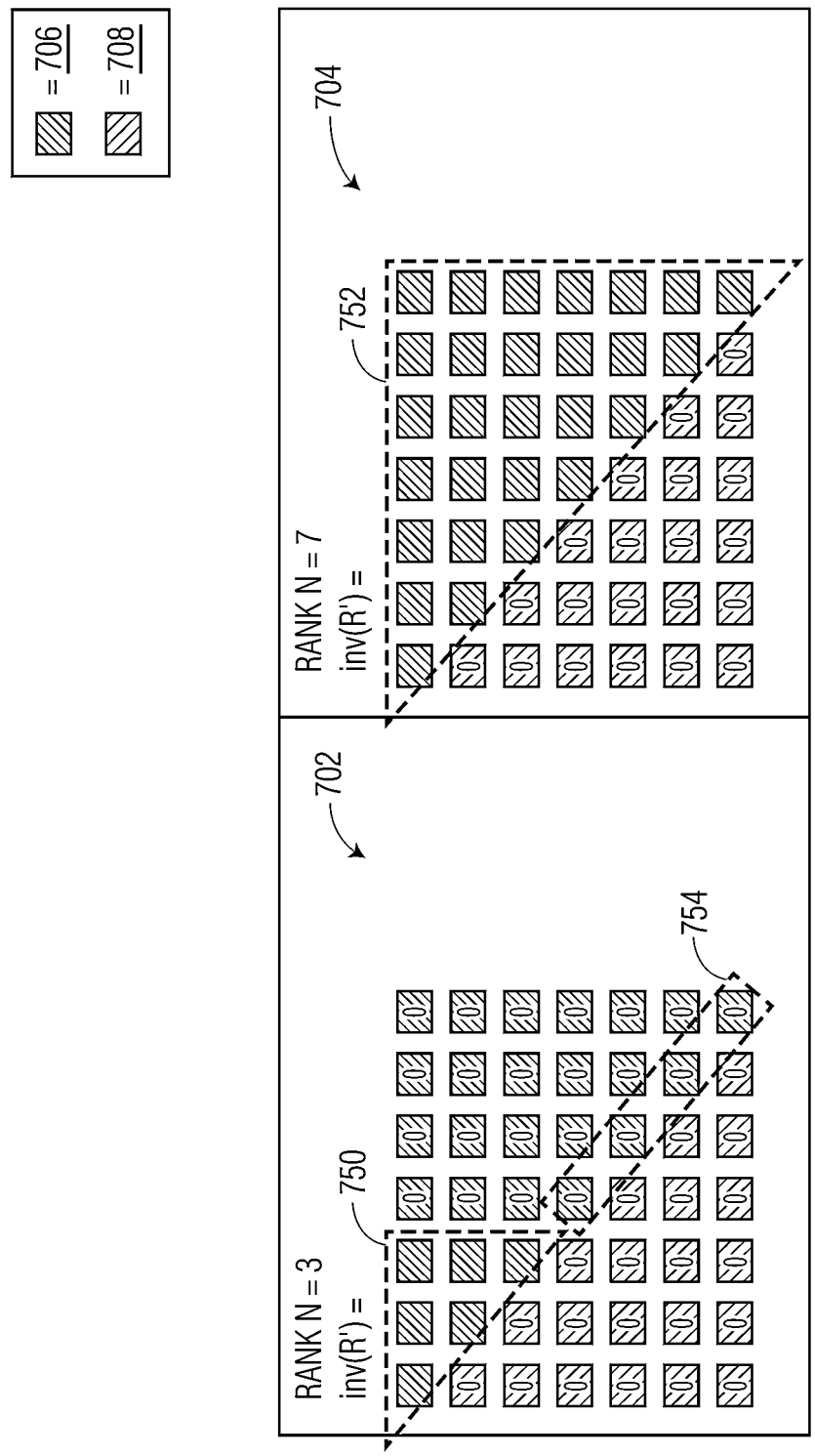
FIG. 7 illustrates a visual depiction of matrices in a process according to an embodiment of the invention.

With the inverse of the upper triangular matrices determined, the lower right diagonal "1"'s can now be set back to zero. This is illustrated by matrices 702 and 704 in FIG. 7. With regards to matrix 702, this involves changing the values in the lower right M−N diagonal elements (designated by dashed line 754) to the value 0. The same operation is applied to matrix 604 to generate matrix 704, but because matrix 604 (and matrix 704) has rank N=M, this step does not result in any modifications to the values of matrix 704, leaving the upper right triangle indicated by dashed lines 752 unmodified. In a final step, the rightmost M−N columns of each Q matrix 702 and 704, are set to zero values.

Figure 8:
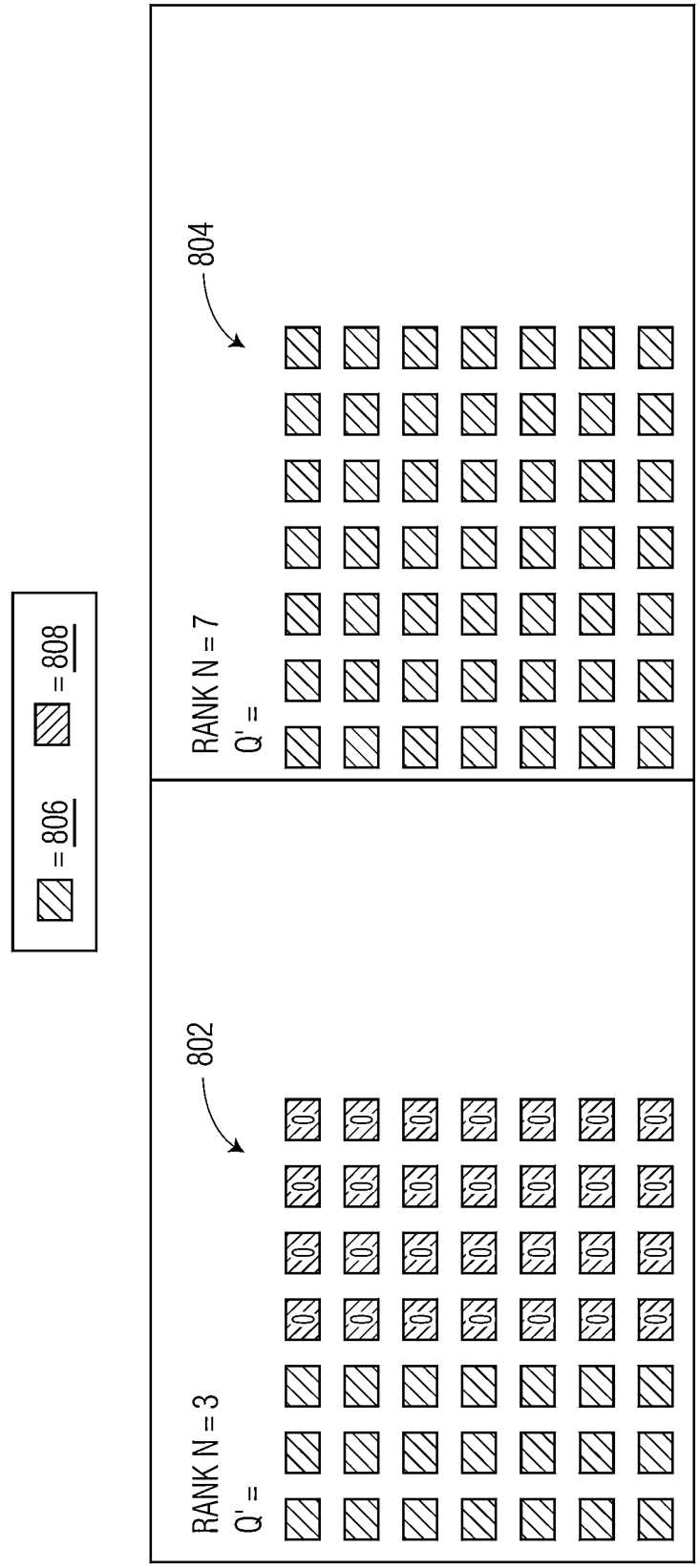
FIG. 8 illustrates a visual depiction of matrices in a process according to an embodiment of the invention.

Each block 806 in matrices 802, 804 is represented with a value as shown. Each block 808 in matrices is represented with a zero value. The result of this operation is illustrated by the modified Q matrices 802, 804. Specifically, with reference to FIG. 8, in Q matrix 802, the rightmost 3 columns (i.e., 7-3) columns have been set to zero values. The same operation has been applied to Q matrix 704 to generate matrix 804; however, because matrix N=M, no columns are modified.

With the inverse upper triangular matrices 702 and 704 determined along with the modified Q matrices 802 and 804, all elements have been determined to enable computation of the pseudo-inverses of the original input matrices 302 and 304 using fixed sized matrix multiplications across all matrix instances. As such, a single instruction set may be used to simultaneously calculate pseudo-inverse values of matrices 302 and 304 simultaneously, enabling execution of that instruction set by a SIMD processing system.

The derived expression for the pseudo-inverse is represented by Equations 2 and 3, below. In radar implementations, the matrices are complex, resulting from 2D FFTs.

In this embodiment, the QR decomposition of an arbitrary M×N matrix with M≥N can be written in block form as represented by Equation (2):

$$M_{M \times N} = Q_{M \times M} R_{M \times N} = (Q_{1,M \times N} \ Q_{2,M \times (M-N)}) \begin{pmatrix} R_{1,N \times N} \\ O_{(M-N) \times N} \end{pmatrix} = Q_{1,M \times N} R_{1,N \times N}$$

The identity relies on the fact that the M×N upper triangular matrix $R_{M \times N}$ must be composed of the square upper triangular block $R_{1,N \times N}$ on top of the zero block $O_{(M-N) \times N}$ by nature of being a rectangular upper triangular matrix. The block decomposition of the M×M matrix $Q_{M \times M}$ into left and right blocks $Q_{1,M \times N}$ and $Q_{2,M \times (M-N)}$ allows block matrix multiplication to establish that only the left hand block $Q_{1,M \times N}$ is required for reconstruction of the M×N matrix $M_{M \times N}$ as represented by Equation (3):

$$M_{M \times N} = Q_{1,M \times N} R_{1,N \times N}$$

The N×M Moore-Penrose pseudo-inverse $M_{N \times M}^+$ is a left inverse and shown to be for the complex case where the t operator means the Hermitian conjugate as represented by Equation (4):

$$M_{N \times M}^+ = (R_{1,N \times N})^{-1} (Q_{1,M \times N})^\dagger$$

since:

$$M_{N \times M}^+ M_{M \times N} =$$

$$(R_{1,N \times N})^{-1} (Q_{1,M \times N})^\dagger Q_{1,M \times N} R_{1,N \times N} = (R_{1,N \times N})^{-1} R_{1,N \times N} = I_{N \times N}$$

The M×M matrices inv(R) have the block form as Equation (5):

$$inv(R) = \begin{pmatrix} (R_{1,N\times N})^{-1} & 0_{N\times(M-N)} \\ 0_{M\times N} & 0_{M\times(M-N)} \end{pmatrix}$$

The M×M matrix Q above (with zeroed rightmost M−N columns) have the block form as Equation (6):

$$Q = (Q_{1,M\times N} \; 0_{M\times(M-N)})$$

Using the standard rules for block matrix multiplication for the complex case as follows with Equation (7):

$$inv(R)(Q)^\dagger = \begin{pmatrix} (R_{1,N\times N})^{-1} & 0_{N\times(M-N)} \\ 0_{M\times N} & 0_{M\times(M-N)} \end{pmatrix}(Q_{1,M\times N} \; 0_{M\times(M-N)})^\dagger$$

$$= \begin{pmatrix} (R_{1,N\times N})^{-1} & 0_{N\times(M-N)} \\ 0_{M\times N} & 0_{M\times(M-N)} \end{pmatrix}\begin{pmatrix} (Q_{1,M\times N})^\dagger \\ (0_{M\times(M-N)})^\dagger \end{pmatrix}$$

$$= \begin{pmatrix} (R_{1,N\times N})^{-1}(Q_{1,M\times N})^\dagger & 0_{N\times(M-N)} \\ 0_{(M-N)\times N} & 0_{(M-N)\times(M-N)} \end{pmatrix}$$

The upper left N×M block in the M×M matrix product is the required pseudo-inverse as known in the art by Equation (8):

$$M^+_{N\times M} = (R_{1,N\times N})^{-1}(Q_{1,M\times N})^\dagger$$

The algorithm described above and depicted in FIGS. 3A-7 enables a SIMD processing system to execute a single instruction set to calculate pseudo-inverse values of a set of input matrices where the matrices may be of different ranks, resulting in the matrices having different geometries. In conventional SIMD processing this could be impossible. But by padding and adjusting the input matrices according to the process set forth above to create padded data frames, a single instruction set can be executed to process all input matrices, regardless of their individual rank.

Optionally and/or alternatively, a SIMD processing system may perform singular value decomposition (SVD) of input matrices as part of a signal processing algorithm. SVD involves decomposition or factorization of the input matrices into corresponding unitary matrix U, diagonal scaling matrix Σ, and unitary matrix V. During processing each of the SIMD processing system's vector cores stores an M× M square matrix. Each core also knows the rank N for its corresponding matrix where 1≤ N≤ M.

Figure 9A:
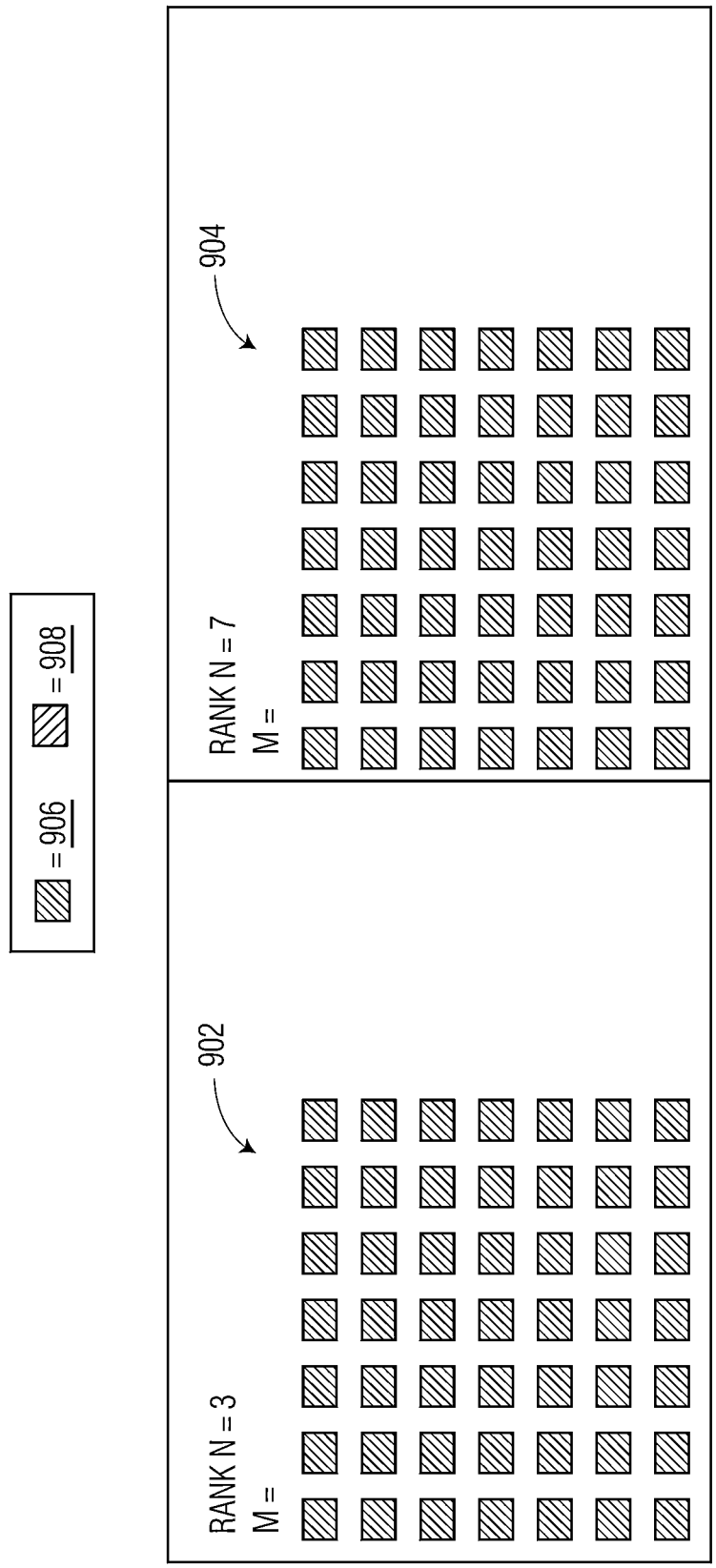
FIGS. 9A-9B illustrate a visual depiction of matrices in a process according to an embodiment of the invention.

More specifically, the process described herein above can be utilized with a SVD. The matrix manipulation methods developed for QR decomposition are applicable to SIMD implementation of the solution of over-determined, exactly determined and under-determined sets of linear equations using SVD. In such case, a pseudo-inverse of the M×N matrix is computed and formed from the leftmost N columns of each matrix using SVD. Since the rank N can be different for each matrix instance, it follows that control plane branch divergence must be addressed. To illustrate, FIG. 9A depicts two matrices 902, 904 in which M=7 and the matrices 902, 904 are dimensions M× M (e.g., range-Doppler data frames). Matrix 902 is of a rank N=3, and matrix 904 is a rank N=7. Because they are of different ranks, matrices 902 and 904 cannot be processed simultaneously. Each block 906 in matrices is represented with a value that is unimportant.

The leftmost N signal space columns are retained, and the remaining M−N noise space columns are zeroed. This is a data plane branch divergence operation but is easily performed by predication, e.g., predication opcodes as known in the art. The matrix elements 908 have a value of 0 after this step.

In order to calculate the pseudo-inverse (e.g., via SVD) of both matrices 902 and 904 using a processing system described herein, the present disclosure provides an approach for manipulating matrices having rank NEM, wherein matrices with rank N<M are padded enabling all matrices in the set of matrices being process are of the same M×M size.

Figure 9B:
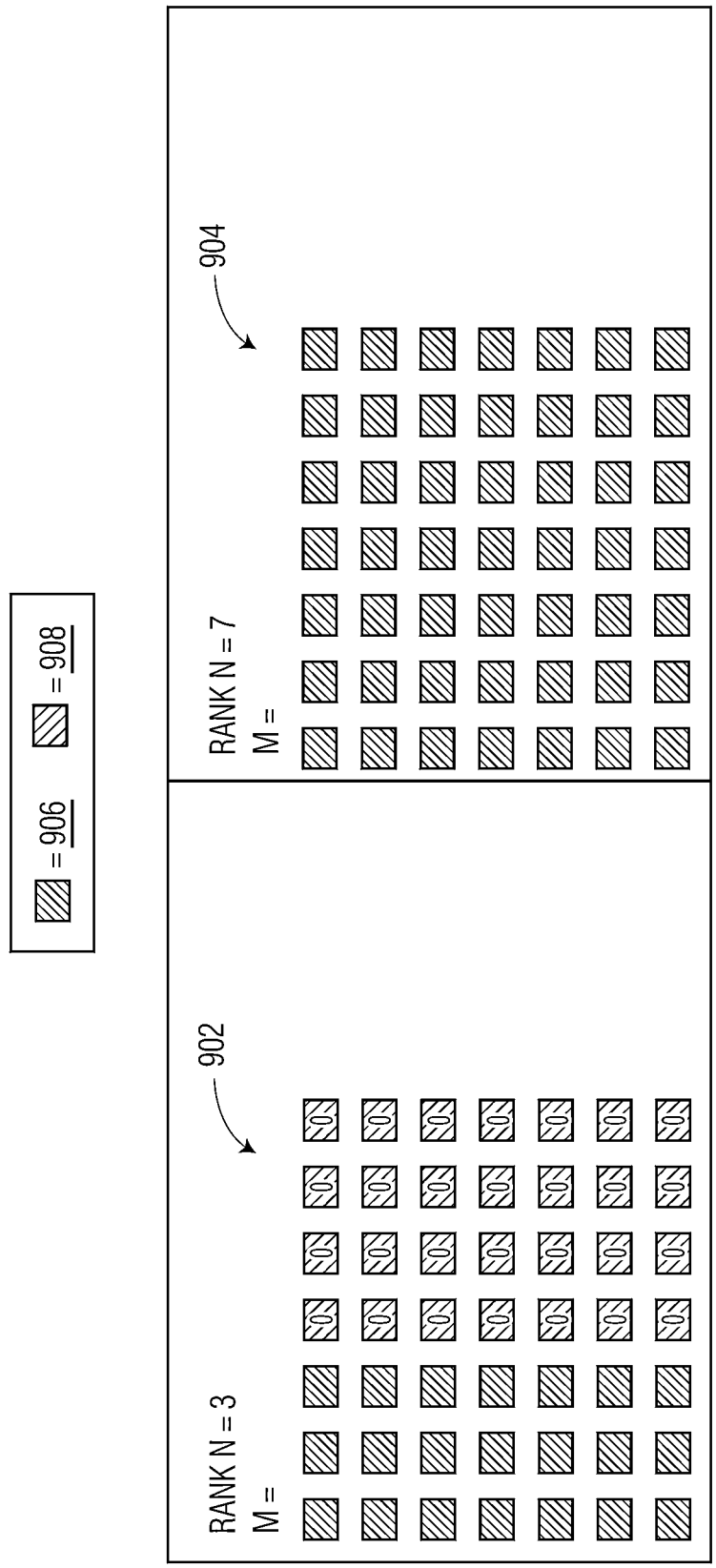

FIG. 9B shows matrices 902 and 904 modified to account for differences in ranking N.

The matrix in FIG. 9B with a rank N=3 is adjusted so the leftmost N signal space columns are retained represented by elements 906 and the remaining M−N noise space columns are zeroed represented by elements 908. This is a data plane branch divergence operation but is easily performed by predication. The matrix elements 908 have value 0 after this step.

Figure 10:
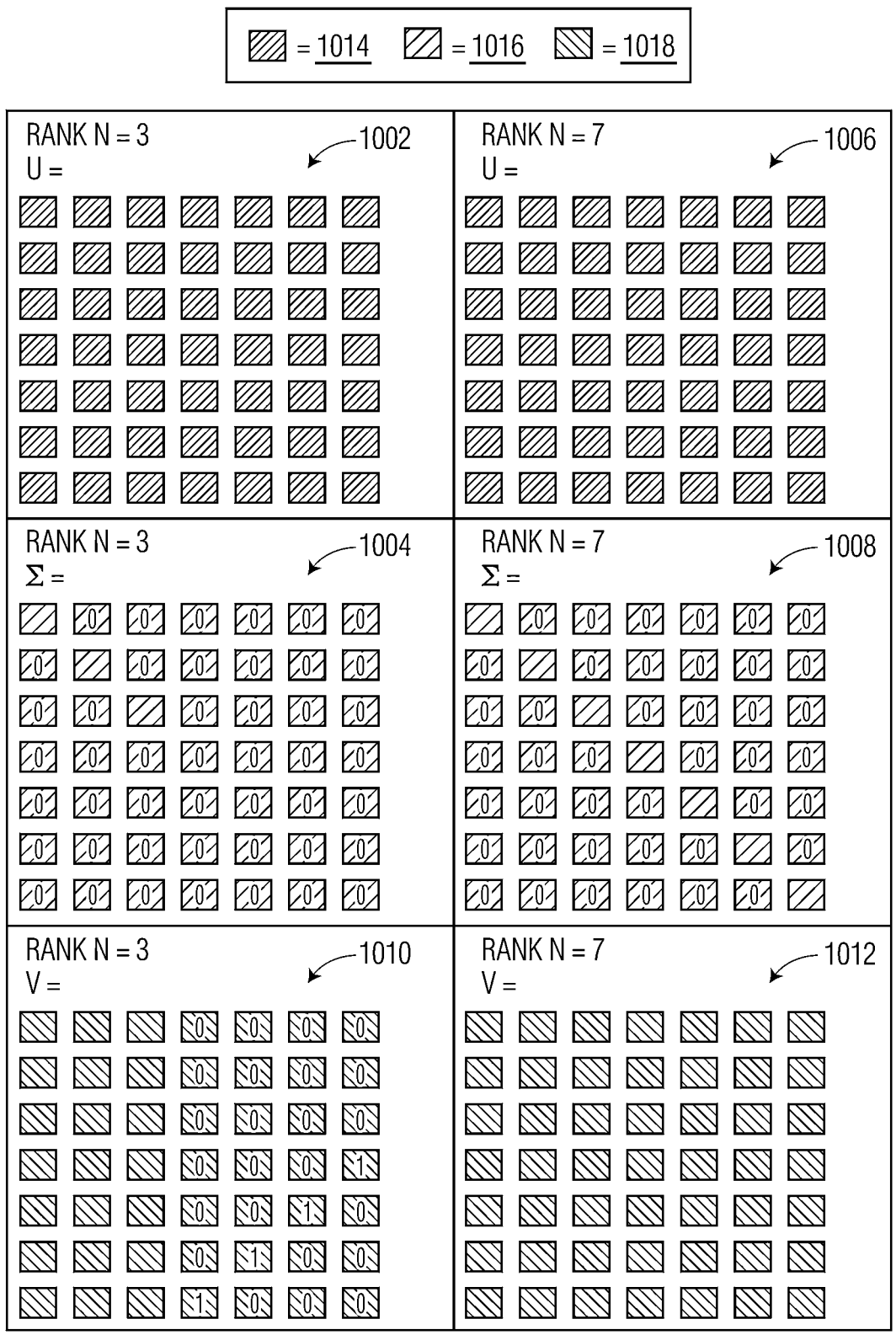
FIG. 10 illustrates a visual depiction of matrices in a process according to an embodiment of the invention.

Referring to FIG. 10, the U, Σ, and V matrices are shown as U with matrices 1002, 1006 having elements 1014, Σ with matrices 1004, 1008 with elements 1016, and V with matrices 1010, 1012 having elements 1018. As shown, the maximum sized square M×M SVD decomposition is performed on all problem instances as known in the art and shown in FIG. 10 and the resulting U, Σ and V are calculated.

Figure 11:
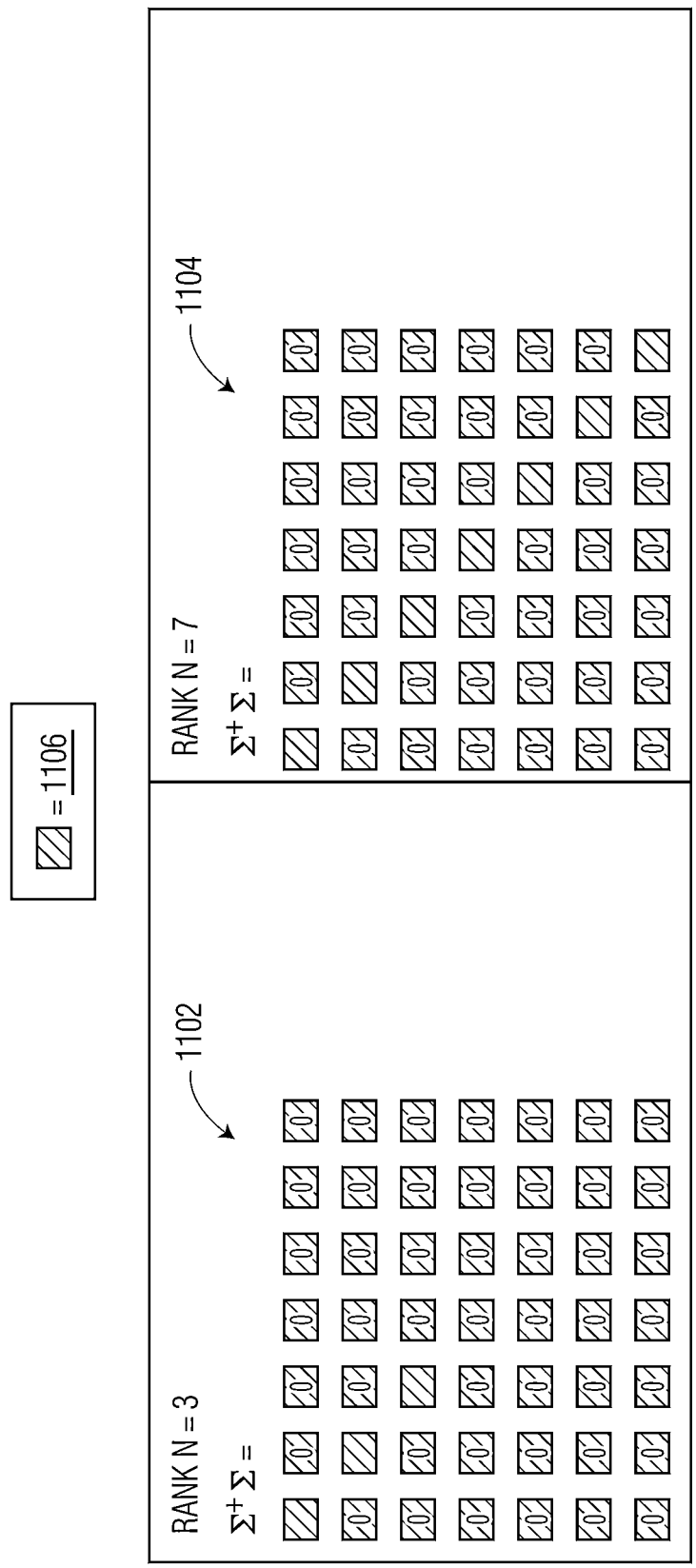
FIG. 11 illustrates a visual depiction of matrices in a process according to an embodiment of the invention.

The matrix Σ†Σ is then computed for the full size M×M matrices as known in the art as shown in FIG. 11 with matrices 1102, 1104 having elements 1106.

Figure 12:
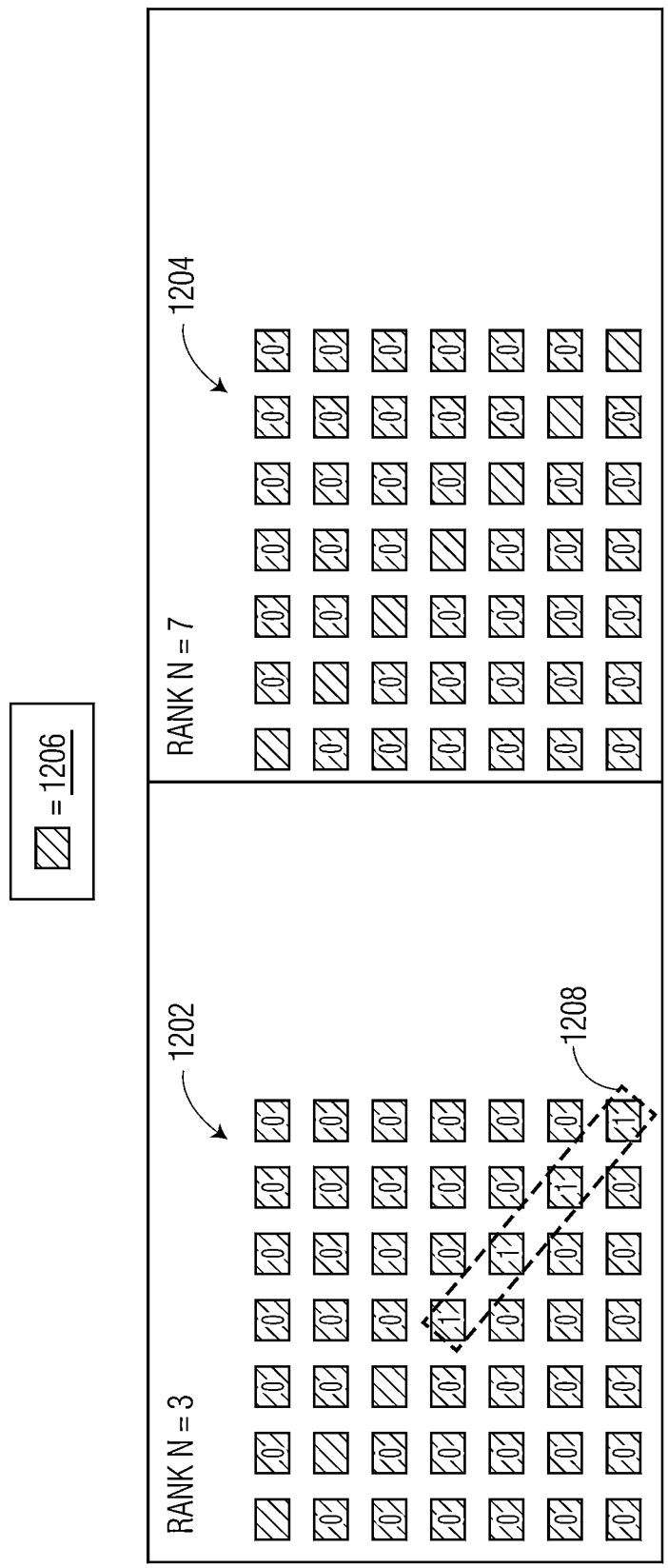
FIG. 12 illustrates a visual depiction of matrices in a process according to an embodiment of the invention.
Figure 13:
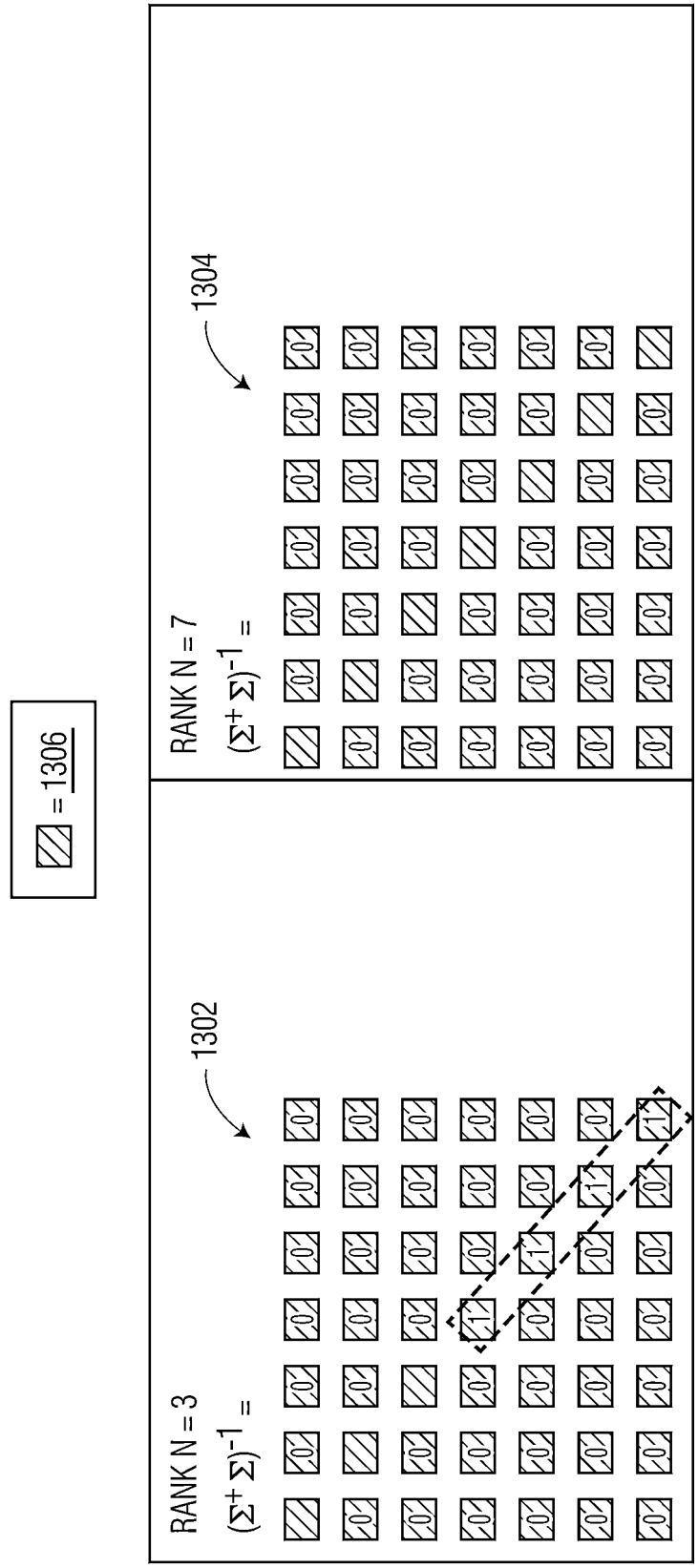
FIG. 13 illustrates a visual depiction of matrices in a process according to an embodiment of the invention.

In FIG. 12, the matrices 1202 and 1204 having elements 1206 are modified. Ones are added down the leading diagonal form the rightmost M−N columns highlighted by block 1208. The matrix inverse (Σ†Σ)⁻¹ is then computed in FIG. 13 having matrices 1302, 1304 with elements 1306. The inverse exists because of the replacement of the lower right block with the identity matrix. The calculation is trivial because in all cases the matrix E+E is diagonal.

Figure 14:
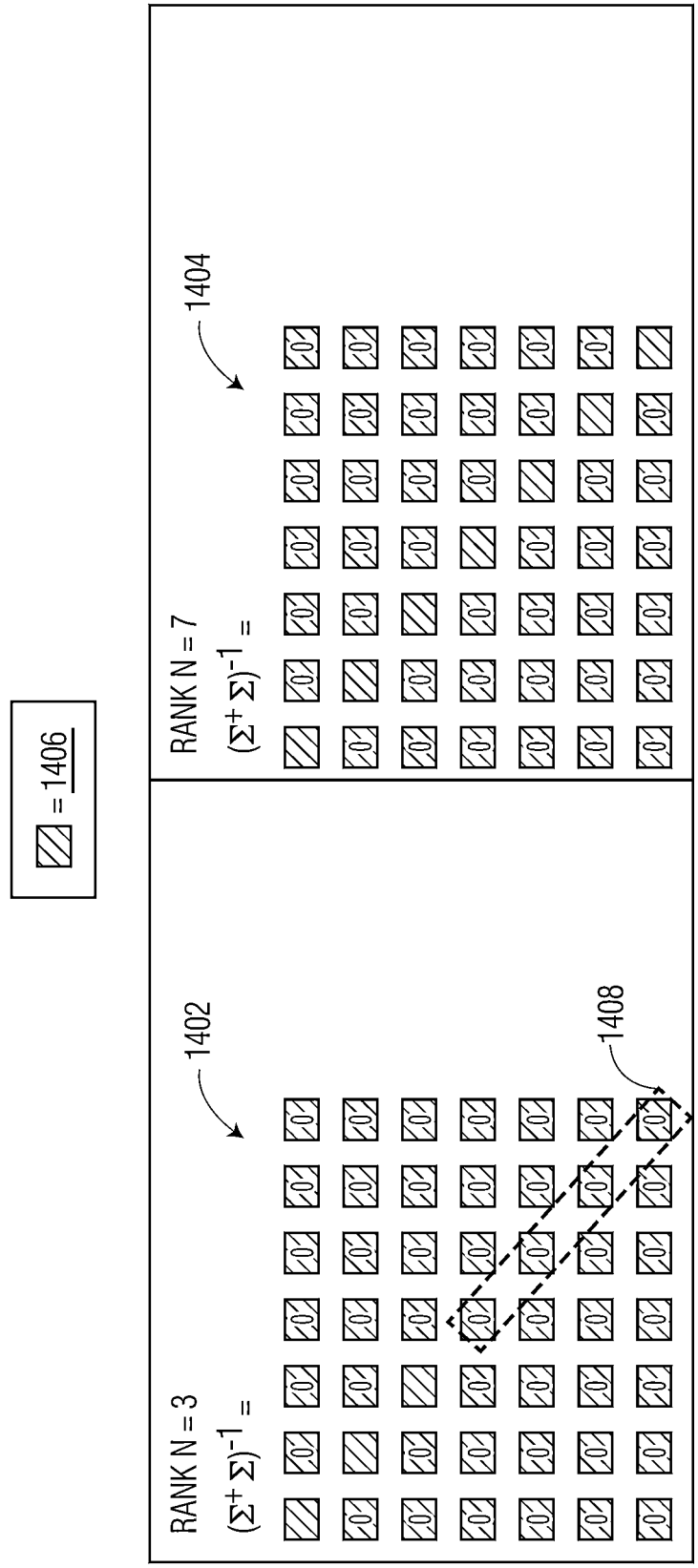
FIG. 14 illustrates a visual depiction of matrices in a process according to an embodiment of the invention.

In FIG. 14, the matrix 1402 having a block identity matrix 1408 in the lower right is then zeroed out. The matrix 1404 is shown and elements of both matrices 1402, 1404 are 1406.

Figure 15:
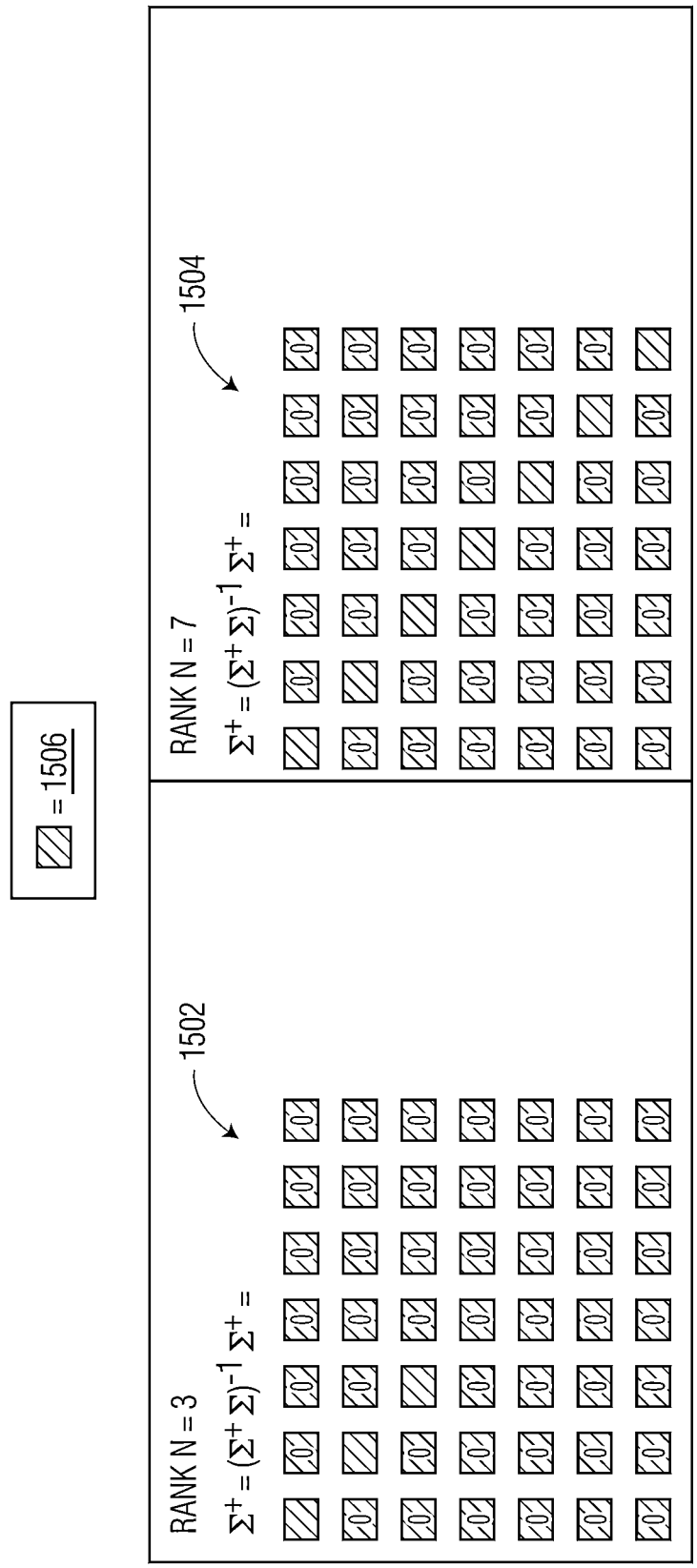
FIG. 15 illustrates a visual depiction of matrices in a process according to an embodiment of the invention.

In FIG. 15, the matrices 1502, 1504 and elements 1506 are shown. The diagonal pseudo-inverse Σ⁺=(Σ˙Σ)⁻¹Σ† is then computed. The required pseudo-inverse can now be calculated with Equation (9):

$$M^+ = V\Sigma^+ U^\dagger$$

Figure 16:
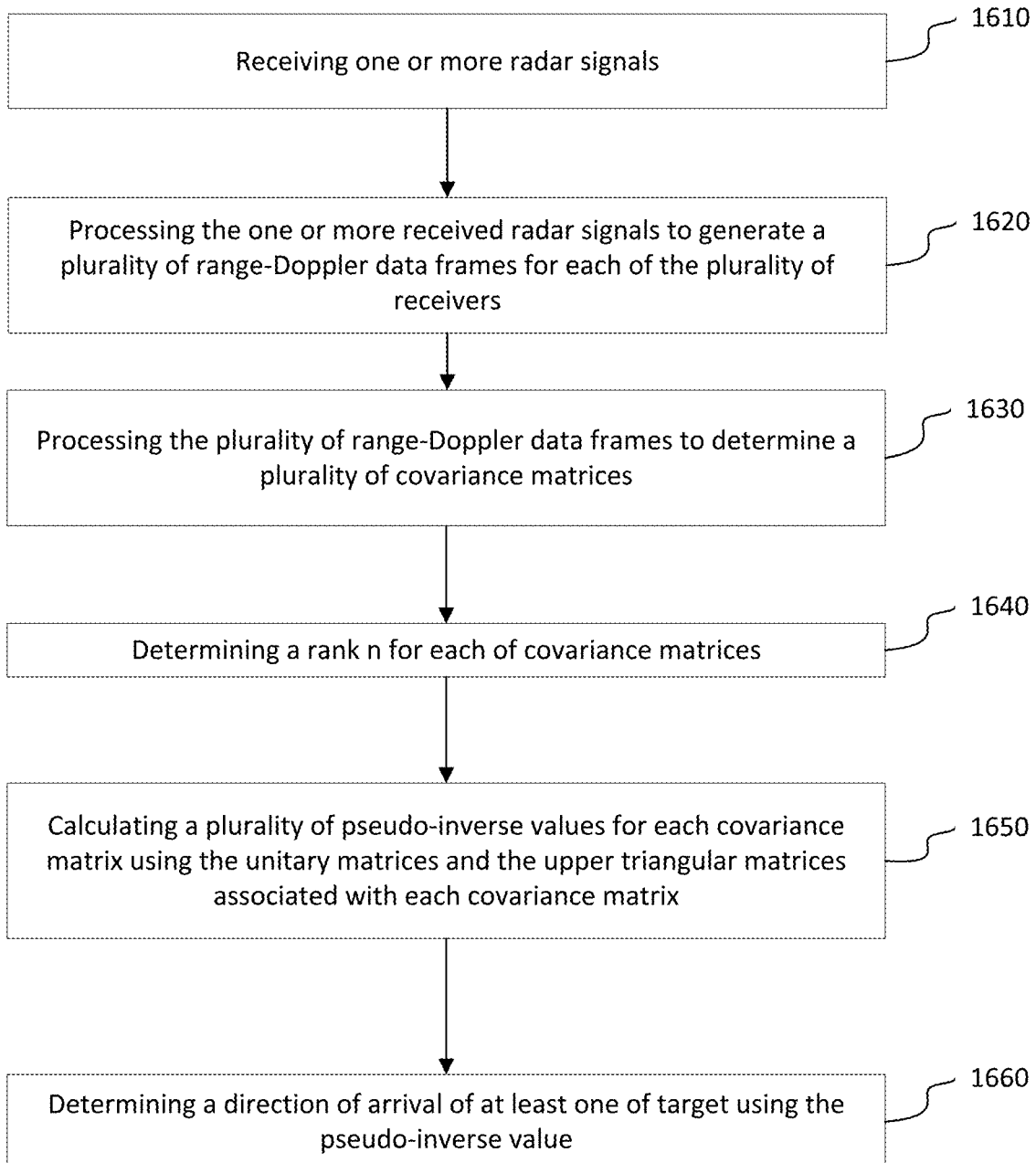
FIG. 16 illustrates an exemplary flowchart for modifying matrices in a set of ranked matrices so that all ranked matrices are of the same dimensions and processing.

FIG. 16 is a flowchart of an example method for modifying matrices in a set of ranked matrices so that all ranked matrices are of the same dimensions and processing with a conventional SIMD processing approach. More specifically, when the matrices have different dimensions or different ranks N the conventional SIMD processing approach cannot be executed against such a set of matrices due to branch divergence resulting from the mismatched sizes. In one embodiment, an automotive radar system including a plurality of transmitters and a plurality of receivers, wherein the plurality of transmitters and the plurality of receivers are configured to transmit and receive radar signals, wherein the plurality of transmitters and the plurality of receivers are coupled to a vehicle.

In one embodiment, the automotive processing system includes at least one processor for performing a method including, step 1610, receiving, from a plurality of receivers, a plurality of received radar signals, each received radar signal of the plurality of received radar signals is associated with a different transmitter of the plurality of transmitters.

In step 1620, processing the received radar signals to generate a plurality of range-Doppler data frames for each of the plurality of receivers.

In step 1630, processing the plurality of range-Doppler data frames to determine a plurality of covariance matrices, wherein each covariance matrix in the plurality of covariance matrices has dimensions of M rows by M columns of elements.

In step 1640, determining, for each covariance matrix in the plurality of covariance matrices, a rank N, wherein the rank N of each covariance matrix indicates a number of potential targets identified in the covariance matrix.

In step 1650 calculating, for each covariance matrix, a unitary matrix and an upper triangular matrix with the system configured by setting all elements in a first subset of columns of the covariance matrix to zero values, where the first subset of columns includes columns numbered N through column M, to generate a full-size covariance matrix. This step further includes performing decomposition of the covariance matrix to generate a first unitary matrix and a first upper triangular matrix, setting M−N diagonal elements of the first upper triangular matrix to a value 1 to generate a modified upper triangular matrix and calculating an inverse of the modified upper triangular matrix to determine an inverted upper triangular matrix. This step also includes setting the M−N diagonal elements of the modified upper triangular matrix to a value 0 to generate the upper triangular matrix and setting all elements in a second subset of columns of the first unitary matrix to zero values, where the second subset of columns includes columns numbered N through column M, to generate the unitary matrix.

In step 1660, simultaneously calculating a plurality of pseudo-inverse values of the plurality of covariance matrices using the unitary matrices and the upper triangular matrices associated with each covariance matrix.

In step 1670, determining a direction of arrival of at least one of the targets using the plurality of pseudo-inverse values and control an operation of the vehicle using the direction of arrival.

Although the examples have been described with reference to automotive radar systems, the systems and methods described herein may be implemented in conjunction with other types of radar systems. Devices or components described as being separate may be integrated in a single physical device. Also, the units and circuits may be suitably combined in one or more semiconductor devices. That is, the devices described herein may be implemented as a single integrated circuit, or as multiple integrated circuits.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive radar system including a plurality of transmitters and a plurality of receivers, wherein the plurality of transmitters and the plurality of receivers are configured to transmit and receive radar signals, wherein the plurality of transmitters and the plurality of receivers are coupled to a vehicle, comprising:

a processing system comprising at least one electronic processor configured to:

receive, from the plurality of receivers, a plurality of received radar signals, wherein each received radar signal of the plurality of received radar signals is associated with a different transmitter of the plurality of transmitters, process the received radar signals to generate a plurality of range-Doppler data frames for each of the plurality of receivers, process the plurality of range-Doppler data frames to determine a plurality of covariance matrices, wherein each covariance matrix in the plurality of covariance matrices has dimensions of M rows by M columns of elements, determine, for each covariance matrix in the plurality of covariance matrices, a rank N, wherein the rank N of each covariance matrix indicates a number of potential targets identified in the covariance matrix, calculate, for each covariance matrix, a unitary matrix and an upper triangular matrix with the processing system configured to:
set all elements in a first subset of columns of the covariance matrix to zero values, where the first subset of columns includes columns numbered N through column M, to generate a full-size covariance matrix,
perform decomposition of the full-size covariance matrix to generate a first unitary matrix and a first upper triangular matrix,
set M−N diagonal elements of the first upper triangular matrix to a value 1 to generate a modified upper triangular matrix,
calculate an inverse of the modified upper triangular matrix to determine an inverted upper triangular matrix,
set the M−N diagonal elements of the modified upper triangular matrix to a value 0 to generate the upper triangular matrix, and
set all elements in a second subset of columns of the first unitary matrix to zero values, where the second subset of columns includes columns numbered N through column M, to generate the unitary matrix, calculate, simultaneously, a plurality of pseudo-inverse values of the plurality of covariance matrices using the unitary matrices and the upper triangular matrices associated with each covariance matrix, and determine a direction of arrival of at least one of the targets using the plurality of pseudo-inverse values and control an operation of the vehicle using the direction of arrival.

2. The automotive radar system of claim 1, wherein the processing system includes a single instruction multiple data processing system; wherein the single instruction multiple data processing system includes a processor coupled to a plurality of vector cores, wherein the processor is configured to execute the single instruction set to simultaneously modify data stored in each vector core of the plurality of vector cores.

3. The automotive radar system of claim 2, wherein each vector core of the plurality of vector cores stores a covariance matrix of the plurality of covariance matrices.

4. The automotive radar system of claim 1, wherein the rank N of each covariance matrix is determined by comparing each value in each covariance matrix to a predetermined threshold value.

5. The automotive radar system of claim 4, wherein a first rank N of a first covariance matrix in the plurality of covariance matrices is different from a second rank N of a second covariance matrix.

6. The automotive radar system of claim 1, wherein the plurality of pseudo-inverse values are Moore-Penrose pseudo-inverse values.

7. A system, comprising:
at least one receiver configured to receive radar signals; and
a processing system configured to:
receive, from the at least one receiver, a received radar signal,
process the received radar signal to generate a data frame that has dimensions of M rows by M columns of elements from a covariance matrix,
determine a rank N of the data frame,
set all elements in a first subset of columns numbered N through M of the data frame to zero values to create a padded data frame,
calculate a pseudo-inverse value of the padded data frame,
determine a direction of arrival of at least one target using the pseudo-inverse value, and
control an operation of a vehicle using the direction of arrival.

8. The system of claim 7, wherein the processing system includes a single instruction multiple data processing system having a plurality of vector cores, wherein the data frame is stored in a first vector core of the plurality of vector cores.

9. The system of claim 8, wherein the processing system is configured to:
receive, from the at least one receiver, a second received radar signal,
process the second received radar signal to generate a second data frame that has dimensions of M rows by M columns of elements from the covariance matrix, and
store the second data frame into a second vector core of the plurality of vector cores.

10. The system of claim 7, wherein the rank N of the data frame is determined by comparing each value in the data frame to a predetermined threshold value.

11. The system of claim 7, wherein the pseudo-inverse value is a Moore-Penrose pseudo-inverse value.

12. The system of claim 7, wherein the processing system is configured to, before calculating the pseudo-inverse value of the padded data frame, decompose the padded data frame into a first unitary matrix and a first upper triangular matrix.

13. The system of claim 12, wherein the processing system is configured to, after decomposing the padded data frame into the first unitary matrix and the first upper triangular matrix:
set M−N diagonal elements of the first upper triangular matrix to a value 1 to generate a modified upper triangular matrix,
calculate an inverse of the modified upper triangular matrix to determine an inverted upper triangular matrix,
set the M−N diagonal elements of the modified upper triangular matrix to a value 0 to generate an second upper triangular matrix, and
set all elements in a second subset of columns of the first unitary matrix to zero values, where the second subset of columns includes columns numbered N through column M, to generate a unitary matrix and wherein the processing system is configured to calculate the pseudo-inverse value of the padded data frame using the second upper triangular matrix and the unitary matrix.

14. A method, comprising:
receiving, from at least one receiver of a radar system, a received radar signal,
processing the received radar signal to generate a covariance matrix and a data frame that has dimensions of M rows by M columns of elements from the covariance matrix,
determining a rank N of the data frame,
setting all elements in a first subset of columns numbered N through M of the data frame to zero values to create a padded data frame, calculating a pseudo-inverse value of the padded data frame, and determining a direction of arrival of at least one of target using the pseudo-inverse value.

15. The method of claim 14, further comprising calculating the pseudo-inverse value of the padded data frame with a single instruction multiple data processing system having a plurality of vector cores, wherein the data frame is stored in a first vector core of the plurality of vector cores.

16. The method of claim 15, further comprising receiving, from the at least one receiver, a second received radar signal, processing the second received radar signal to generate a second data frame that has dimensions of M rows by M columns of elements, and storing the second data frame into a second vector core of the plurality of vector cores.

17. The method of claim 14, further comprising determine the rank N of the data frame by comparing each value in the data frame to a predetermined threshold value.

18. The method of claim 14, wherein calculating the pseudo-inverse value includes calculating a Moore-Penrose pseudo-inverse value of the padded data frame.

19. The method of claim 14, further comprising, before calculating the pseudo-inverse value of the padded data frame, decomposing the padded data frame into a first unitary matrix and a first upper triangular matrix.

20. The method of claim 19, further comprising, after decomposing the padded data frame into the first unitary matrix and the first upper triangular matrix:

setting M–N diagonal elements of the first upper triangular matrix to a value 1 to generate a modified upper triangular matrix, calculating an inverse of the modified upper triangular matrix to determine an inverted upper triangular matrix, setting the M–N diagonal elements of the modified upper triangular matrix to a value 0 to generate a second upper triangular matrix, and setting all elements in a second subset of columns of the first unitary matrix to zero values, where the second subset of columns includes columns numbered N through column M, to generate a unitary matrix.

* * * * *